(12) United States Patent
Deboy et al.

(10) Patent No.: US 9,461,474 B2
(45) Date of Patent: Oct. 4, 2016

(54) POWER CONVERTER CIRCUIT WITH AC OUTPUT

(75) Inventors: Gerald Deboy, Klagenfurt (AT); Yi Tang, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 1108 days.

(21) Appl. No.: 13/440,629

(22) Filed: Apr. 5, 2012

(65) Prior Publication Data

US 2013/0181531 A1 Jul. 18, 2013

Related U.S. Application Data

(63) Continuation-in-part of application No. 13/352,202, filed on Jan. 17, 2012.

(51) Int. Cl.
*H02J 1/00* (2006.01)
*H02J 3/38* (2006.01)
(Continued)

(52) U.S. Cl.
CPC .............. *H02J 3/385* (2013.01); *H02J 3/387* (2013.01); *H02J 3/40* (2013.01); *H02M 2001/007* (2013.01); *Y02E 10/58* (2013.01); *Y10T 307/707* (2015.04)

(58) Field of Classification Search
CPC ............ H02J 3/385; H02J 3/387; H02J 3/40; Y10T 307/707; H02M 2001/007; H02M 2001/0077
See application file for complete search history.

(56) References Cited

U.S. PATENT DOCUMENTS 3,466,456 A 9/1969 Tolworthy
4,719,550 A 1/1988 Powell et al.
(Continued)

FOREIGN PATENT DOCUMENTS

CA 2702392 4/2009
CN 102148509 A 8/2011
(Continued)

OTHER PUBLICATIONS

Alonso, O., et al., "Cascaded H-Bridge Multilevel Converter for Grid Connected Photovoltaic Generators with Independent Maximum Power Point Tracking of Each Solar Array," IEEE 34th Annual Power Electronics Specialist Conference (PESC '03), vol. 2, Jun. 15-19, 2003, pp. 731-735.
(Continued)

*Primary Examiner* — Daniel Cavallari
(74) *Attorney, Agent, or Firm* — Slater Matsil, LLP

(57) ABSTRACT

A power converter circuit includes output terminals configured to receive an external voltage. A series circuit with a number of converter units is connected between the output terminals of the power converter circuit. Each converter unit includes input terminals configured to be coupled to a DC power source and output terminals configured to provide an output current. At least one converter unit of the converter units includes a signal generator configured to receive a synchronization signal and to generate a continuous synchronization signal from the synchronization signal. The power converter circuit can be operated in a normal operation mode. In the normal operation mode, the at least one converter unit is configured to regulate generation of the output current such that a frequency and/or a phase of the output current are dependent on the continuous synchronization signal.

20 Claims, 22 Drawing Sheets

(51) Int. Cl.
*H02J 3/40* (2006.01)
*H02M 1/00* (2006.01)

(56) References Cited

U.S. PATENT DOCUMENTS

| | | | |
|---|---|---|---|
| 5,518,624 | A | 5/1996 | Filson et al. |
| 5,837,594 | A | 11/1998 | Honma et al. |
| 6,542,344 | B1 | 4/2003 | Mashiko |
| 6,764,898 | B1 | 7/2004 | En et al. |
| 7,037,787 | B2 | 5/2006 | Fan et al. |
| 7,126,315 | B2 | 10/2006 | Seo |
| 7,808,125 | B1 | 10/2010 | Sachdeva et al. |
| 7,962,249 | B1 | 6/2011 | Zhang et al. |
| 8,026,704 | B2 | 9/2011 | Kapels et al. |
| 8,432,709 | B2 | 4/2013 | Huang et al. |
| 9,143,056 | B2 | 9/2015 | Ilic et al. |
| 2003/0148625 | A1 | 8/2003 | Ho et al. |
| 2004/0040501 | A1 | 3/2004 | Vaartstra |
| 2004/0051134 | A1 | 3/2004 | Jang et al. |
| 2004/0178766 | A1 | 9/2004 | Bucur et al. |
| 2005/0064716 | A1 | 3/2005 | Lin et al. |
| 2006/0151324 | A1 | 7/2006 | Davies et al. |
| 2006/0281212 | A1 | 12/2006 | Moriceau et al. |
| 2006/0286785 | A1 | 12/2006 | Rogers et al. |
| 2007/0023822 | A1 | 2/2007 | Sung et al. |
| 2007/0197048 | A1 | 8/2007 | Sekine et al. |
| 2007/0224813 | A1 | 9/2007 | Shen et al. |
| 2007/0246752 | A1 | 10/2007 | Cheng et al. |
| 2007/0252191 | A1 | 11/2007 | Kim et al. |
| 2008/0003776 | A1 | 1/2008 | Takami et al. |
| 2008/0303503 | A1 | 12/2008 | Wolfs |
| 2008/0315310 | A1 | 12/2008 | Rachmady et al. |
| 2009/0023259 | A1 | 1/2009 | Shum et al. |
| 2009/0189280 | A1 | 7/2009 | Shum et al. |
| 2009/0212629 | A1 | 8/2009 | Paull |
| 2009/0284232 | A1 | 11/2009 | Zhang et al. |
| 2010/0195361 | A1 | 8/2010 | Stem |
| 2011/0140535 | A1 | 6/2011 | Choi et al. |
| 2011/0148195 | A1 | 6/2011 | Lee |
| 2011/0242857 | A1 | 10/2011 | Kim et al. |
| 2011/0285375 | A1 | 11/2011 | Deboy |
| 2012/0087157 | A1 | 4/2012 | Huang et al. |
| 2012/0091817 | A1 | 4/2012 | Seymour et al. |
| 2012/0126623 | A1 | 5/2012 | Koehl |
| 2012/0175964 | A1 | 7/2012 | Yoscovich et al. |
| 2012/0300515 | A1 | 11/2012 | Carletti et al. |
| 2013/0009700 | A1 | 1/2013 | Deboy et al. |
| 2013/0155735 | A1* | 6/2013 | Ilic .................. H02M 7/72 363/71 |
| 2013/0155736 | A1 | 6/2013 | Ilic et al. |
| 2013/0181529 | A1 | 7/2013 | Tang et al. |
| 2013/0181530 | A1 | 7/2013 | Deboy et al. |
| 2013/0181573 | A1 | 7/2013 | Hines et al. |
| 2013/0187473 | A1 | 7/2013 | Deboy et al. |
| 2014/0169053 | A1 | 6/2014 | Ilic et al. |
| 2014/0175888 | A1 | 6/2014 | Deboy |
| 2014/0191582 | A1 | 7/2014 | Deboy et al. |
| 2015/0008748 | A1 | 1/2015 | Deboy |

FOREIGN PATENT DOCUMENTS

| | | |
|---|---|---|
| DE | 202010007960 U1 | 10/2010 |
| EP | 2 477 318 A2 | 7/2012 |
| GB | 2483317 A | 3/2012 |
| JP | 11089242 | 3/1999 |
| JP | 2000166097 A | 6/2000 |
| JP | 2008118809 A | 5/2008 |
| KR | 100911122 B1 | 8/2009 |
| WO | 2007082753 A2 | 7/2007 |
| WO | WO 2009/105678 A2 | 8/2009 |
| WO | WO 2012/016285 A1 | 2/2012 |
| WO | WO 2013/030236 A2 | 3/2013 |

OTHER PUBLICATIONS

Huber, L. et al., "Performance Evaluation of Bridgeless PFC Boost Rectifiers," Feb. 2007 IEEE, pp. 165-171.
Kolar, J.W. et al., "Extreme Efficiency Power Electronics," Mar. 6-8, 2012, Proceedings of the International Conference of Integrated Power Electronics Systems (CIPS 2012), 23 pages.
Trubitsyn, A. et al., "High-Efficiency Inverter for Photovoltaic Applications," Sep. 12-16, 2010, IEEE, pp. 2803-2811.
Yang, B. et al., "LLC Resonant Converter for Front End DC/DC Conversion," Mar. 10-14, 2002, IEEE, 5 pages.
Mekhilef, S., et al., "Implementation of Grid-Connected Photovoltaic System with Power Factor Control and Islanding Detection," Jun. 20-25, 2004, 35th Annual IEEE Power Electronics Specialists Conference, pp. 1409-1412.
Ranade, S., et al., "A Study of Islanding in Utility-Connected Residential Photovoltaic Systems: Part I—Models and Analytical Methods," 8047d IEEE Transactions on Energy Conversion 4(1989) Sep., No. 3, New York, US, 11 pgs.
Ertl, H., et al., "A Novel Multicell DC-AC Converter for Applications in Renewable Energy Systems," IEEE Transactions on Industrial Electronics, vol. 49, No. 5, Oct. 2002, pp. 1048-1057.
Walker, G., et al., "Cascaded DC-DC Converter Connection of Photovoltaic Modules," IEEE Transactions on Power Electronics, vol. 19, No. 4, Jul. 2004, pp. 1130-1139.
Sahan, B., "Wechselrichtersysteme mit Stromzwischenkreis zur Netzanbindung von PV-Generatoren," ISBN 978-3-89958-912-2, 2010, 10 pages.
Johnson, B., et al., "Photovoltaic AC Module Composed of a Very Large Number of Interleaved Inverters," Twenty-Sixth Annual IEEE Applied Power Electronics Conference and Exposition (APEC), Mar. 6-11, 2011, pp. 976-981, Fort Worth, Texas.

* cited by examiner

POWER CONVERTER CIRCUIT WITH AC OUTPUT

This is a continuation-in-part application of U.S. application Ser. No. 13/352,202, which was filed on Jan. 17, 2012 and is incorporated herein by reference.

TECHNICAL FIELD

Embodiments of the present invention relate to a power converter circuit, a power supply system with a power converter circuit, and a method for operating a power converter circuit.

BACKGROUND

With an increasing interest in sustainable energy production there is a focus on using photovoltaic modules for producing electric power. Photovoltaic (PV) modules include a plurality of photovoltaic (PV) cells, that are also known as solar cells. Since the output voltage of one cell is relatively low, a PV module usually includes a string with a plurality of series connected solar cells, such as between 50 to 100 cells connected in series, or even several such strings connected in parallel.

A PV module provides a DC supply voltage, while power grids, such as national power grids, have an AC supply voltage. In order to supply the energy provided by a PV module to the power grid it is, therefore, necessary to convert the DC voltage of the PV module into an AC voltage that is consistent with the AC supply voltage of the power grid.

A first approach for converting the PV module DC voltage into a power grid AC voltage includes connecting several PV modules in series so as to obtain a DC voltage that is higher than the peak voltage of the power grid AC voltage, and converting the DC voltage into the AC voltage using a DC/AC converter. The amplitude of the DC voltage is typically between 200V and 1000V. High DC voltages, however, are critical in terms of the occurrence of electric arcs.

According to a second approach, a plurality of DC/AC converters are provided, where each of these converters is connected to a PV module. The individual converters have their AC voltage outputs connected in parallel and each of these converters generates an AC voltage that is consistent with the power grid AC supply voltage from the DC voltage provided by the string of solar cells. The DC voltage provided by one PV module usually has an amplitude in the range of between 20V and 100V, depending on the number of cells that are connected in series within one module and depending on the technology used to implement the solar cells, while the peak voltage of the power grid AC voltage is about 155V or 325V, depending on the country. However, due to the large difference between input and output voltages these converters have a disadvantage in terms of efficiency.

According to a further approach, several DC/AC converters are connected in series, where each of these converters receives a DC supply voltage from a PV module. In this system a central control unit is employed to synchronize the individual DC/AC converters in a multi-level switching pattern. This system requires constant synchronized control of all individual units.

There is, therefore, need for a power converter circuit that is capable of efficiently transforming relatively low DC supply voltages into an AC supply voltage that is consistent with a power grid voltage.

SUMMARY OF THE INVENTION

A first aspect relates to a power converter circuit. The power converter circuit includes output terminals configured to receive an external voltage, at least one series circuit with at least two converter units connected between the output terminals of the power converter circuit, each converter unit including input terminals configured to be coupled to a DC power source, output terminals for providing an output current, and a signal generator, and at least one converter unit including a signal generator configured to receive a synchronization signal and configured to generate a continuous synchronization signal from the synchronization signal. The power converter can be operated in a normal operation mode, wherein in the normal mode, the at least one converter unit is configured to regulate a generation of the output current such that at least one of a frequency and a phase of the output current are dependent on the continuous synchronization signal.

A second aspect relates to a power supply system. The power supply system includes output terminals configured to receive an external voltage, at least one series circuit with at least two converter units connected between the output terminals of the power converter circuit, each converter unit including input terminals and output terminals for providing an output current, and at least one converter unit including a signal generator configured to receive a synchronization signal and configured to generate a continuous synchronization signal from the synchronization signal. The power supply system further includes at least two DC power sources, with each DC power source coupled to the input terminals of one converter unit. The power supply system can be operated in a normal operation mode, wherein in the normal mode, the at least one converter unit is configured to regulate a generation of the output current such that at least one of a frequency and a phase of the output current are dependent on the continuous synchronization signal.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like signals and circuit components.

FIG. 2 which includes

FIG. 4 which includes

FIG. 7 which includes

DETAILED DESCRIPTION OF ILLUSTRATIVE EMBODIMENTS

In the following detailed description, reference is made to the accompanying drawings, which form a part thereof, and in which is shown by way of illustration specific embodiments in which the invention may be practiced. In this regard, directional terminology, such as "top," "bottom," "front," "back," "leading," "trailing," etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

In the following, embodiments of the present invention will be explained in a specific context, namely in the context of converting electrical power or electrical voltages provided by a plurality of photovoltaic arrays into an AC voltage, specifically an AC power grid supply voltage. However, this is only an example, embodiments of the invention may be employed in a wide range of applications in which a conversion of DC voltages into an AC voltage is required. Any type of DC power source may be used instead of a photovoltaic array, such as a fuel cell. It is even possible, to employ DC power source of different types, such as photovoltaic arrays and fuel cells, in one application.

Figure 1:
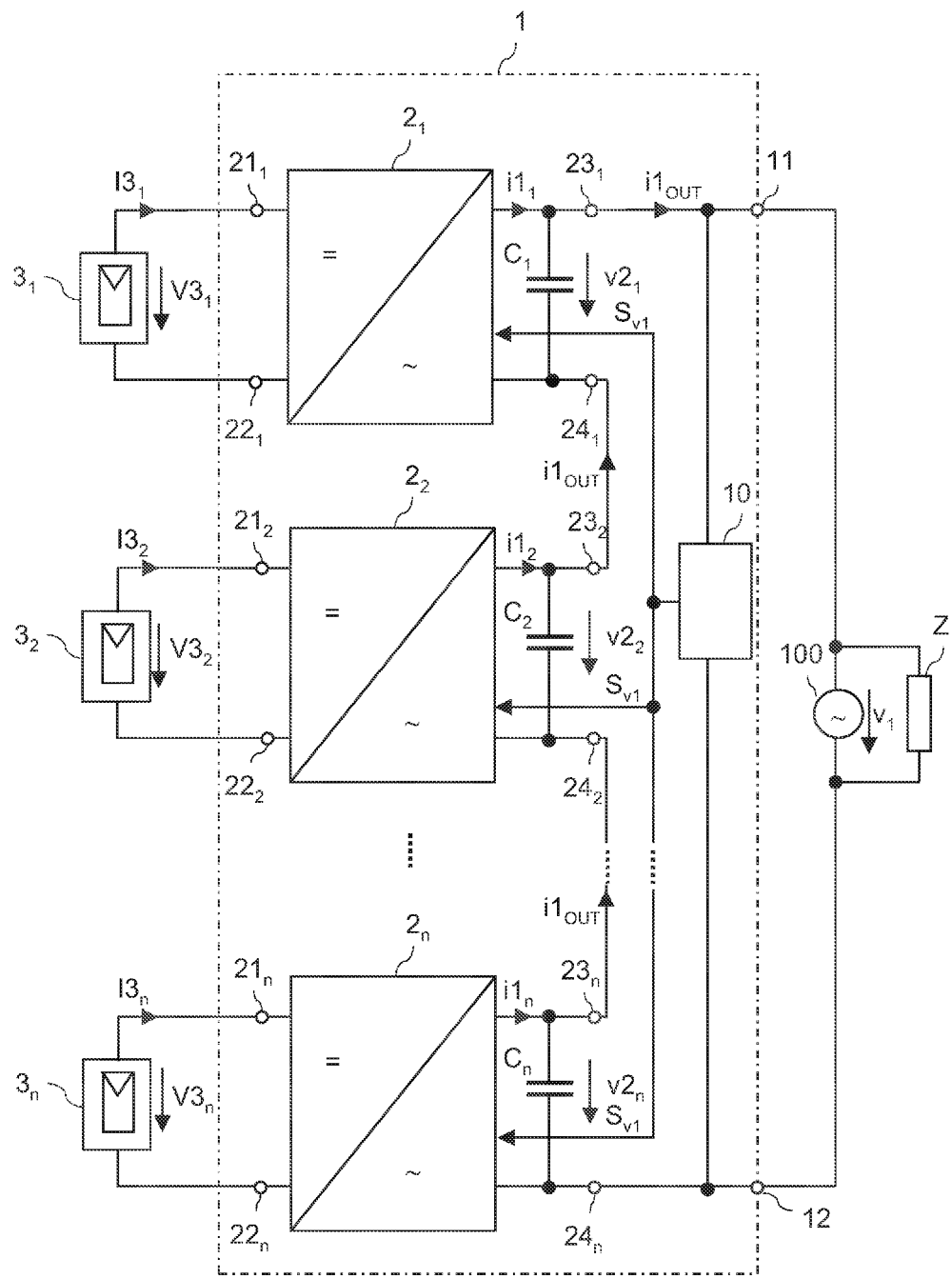
FIG. 1 schematically illustrates a power converter circuit including a plurality of DC/AC converter units connected in series and a voltage measurement circuit.

FIG. 1 illustrates a first embodiment of a power converter circuit (power inverter circuit) 4 for converting a plurality of n (at least two) DC input voltages $V3_1$, $V3_2$, $V3_n$ into one AC output voltage v1. It should be noted in this connection that throughout the drawings DC voltages and DC currents will be denoted using capital letters "V" and "I", while AC voltages and AC currents will be denoted using lowercase letters "v" and "i". The power converter circuit includes a plurality of n (at least two) converter units $2_1$, $2_2$, $2_n$, with n≥2. Each of these converter units includes input terminals $21_1$, $22_1$; $21_2$, $22_2$; and $21_n$, $22_n$ that are configured to be coupled to a DC power source $3_1$, $3_2$, $3_n$. In FIG. 1, besides the power converter circuit 1 with the converter units $2_1$, $2_2$, $2_n$ DC power sources $3_1$, $3_2$, $3_n$ are also illustrated. These DC power sources $3_1$, $3_2$, $3_n$ together with the power converter circuit 1 form an AC power supply system or an AC current supply system. The DC power sources $3_1$, $3_2$, $3_n$ are implemented as photovoltaic (PV) modules in the embodiment illustrated in FIG. 1. However employing PV modules as DC power sources is only an example. Any other type of DC power source, such as a power source including fuel cells, may be used as well. It is even possible to employ different types of DC power sources in one power supply system.

Each of the converter units $2_1$, $2_2$, $2_n$ further includes output terminals $23_1$, $24_1$; $23_2$, $24_2$; and $23_n$, $24_n$. The converter units $2_1$, $2_2$, $2_n$ are connected in series (in cascade) between output terminals 11, 12 of the power converter circuit 1. For this, a first converter unit $2_1$ has a first output terminal $23_1$ coupled to a first output terminal 11 of the power converter circuit 1 and a last converter unit $2_n$ in the cascade has a second output terminal $24_n$ coupled to a second output terminal 12 of the power converter circuit 1. Further, each of the first output terminals (other than output terminal $23_1$) are connected to one second output terminal (other than output terminal $24_n$) of another converter unit.

The output terminals 11, 12 of the power converter circuit 1 are configured to receive a voltage v1. For example, the output terminals 11, 12 are configured to be connected to a power grid, so that the external voltage v1 corresponds to a grid voltage or, more specifically, corresponds to one phase of the power grid. In FIG. 1, the power grid is represented by a voltage source 100 and a load Z connected in parallel with the power source 100. The voltage source 100 of the power grid represents a plurality of AC voltage sources in the power grid, and load Z represents a plurality of loads connected to the power sources in the power grid. The power grid defines the AC voltage v1 between the output terminal. Since this voltage v1 is defined by an external source, such as the power grid, this voltage will be referred to as external AC voltage v1 in the following.

Each of the converter units $2_1$, $2_2$, $2_n$ provides an AC output voltage $v2_1$, $v2_2$, $v2_n$ between its output terminals $23_1$, $24_1$, $23_2$, $24_2$, $23_n$, $24_n$. By having the converter units $2_1$, $2_2$, $2_n$ connected in series, the sum of the individual AC output voltages $v2_1$, $v2_2$, $v2_n$ of the converter units $2_1$, $2_2$, $2_n$ corresponds to the external voltage v1 when the power converter circuit 1 is in the steady state, that is, $$v1 = \sum_{i=1}^{n} v2_i. \tag{1}$$

Each power converter unit $2_1$, $2_2$, $2_n$ further includes an output capacitance $C_1$, $C_2$, $C_n$ connected between the individual output terminals $23_1$, $24_1$, $23_2$, $24_2$, $23_n$, $24_n$ and provides an output current $i1_1$, $i1_2$, $i1_n$. The output current of one converter unit $2_1$, $2_2$, $2_n$ is the current received at a circuit node common to the output capacitance $C_1$, $C_2$, $C_n$ and one of the output terminals. For example, in the first converter unit $2_1$, the output current of the converter unit $2_1$ is the current flowing into the circuit node at which the output capacitor $C_1$ is connected to the first output terminal $23_1$. The current flowing from the first output terminal $23_1$ of the first converter unit $2_1$ will be referred to as converter circuit output current $i_{OUT}$. This current corresponds to the current flowing between the individual converter units $2_1$-$2_n$. The output capacitances $C_1$, $C_2$, $C_n$ are part of the individual converter units $2_1$, $2_2$, $2_n$ and can be implemented in many different ways as will be explained with reference to several examples herein below.

In the steady state, the AC output currents $i1_1$, $i1_2$, $i1_n$ or, more precisely, the rms values of the AC output currents $i1_1$, $i1_2$, $i1_n$, correspond to the power converter circuit output current $i_{OUT}$ or the rms value of the output current $i_{OUT}$, respectively, so that there is very little to no rms current into the output capacitors $C_1$-$C_n$. However, there can be situations in which the output currents $i1_1$, $i1_2$, $i1_n$ of the individual converter units $2_1$, $2_2$, $2_n$ change and in which the output currents $i1_1$, $i1_2$, $i1_n$ are mutually different until the system has settled at new (equal) output currents $i1_1$, $i1_2$, $i1_n$. This is explained in further detail below.

The power converter circuit 1 further includes a synchronization circuit 10 connected between the output terminals 11, 12 of the power converter circuit 1. The synchronization circuit 10 is configured to provide at least one synchronization signal $S_{v1}$. According to one embodiment, the synchronization signal is an AC signal having a phase and a frequency that are dependent on the phase and the frequency, respectively, of the external AC voltage v1.

The individual converter units $2_1$, $2_2$, $2_n$ are each configured to receive one synchronization signal $S_{v1}$. In the embodiment illustrated in FIG. 1, the individual converter units $2_1$, $2_2$, $2_n$ receive the same synchronization signal $S_{v1}$. However, this is only an example. It is also possible to generate one synchronization signal for each of the converter units $2_1$, $2_2$, $2_n$. An embodiment is explained with reference to FIG. 3 herein below. The at least one synchronization signal $S_{v1}$ can be transmitted to the individual converter units $2_1$, $2_2$, $2_n$ in different ways. Referring to FIG. 1, a signal transmission bus can be provided through which the at least one synchronization signal $S_{v1}$ is transmitted to the individual converter units $2_1$, $2_2$, $2_n$. According to a further embodiment (not illustrated in FIG. 1), there is a dedicated transmission path between the voltage synchronization circuit 10 and each of the converter units $2_1$, $2_2$, $2_n$. The signal transmission bus or the signal transmission paths can be implemented like conventional signal transmission buses or like conventional signal transmission paths. The signal bus or the signal paths may include level shifter or other means to transmit the at least one synchronization signal from the synchronization circuit 10 to the individual converter units $2_1$, $2_2$, $2_n$ that (due to being connected in series) have different reference potentials or different voltage domains.

The individual converter units $2_1$, $2_2$, $2_n$ each include at least one internal control loop which will be explained in further detail herein below. The control loop of each converter unit $2_1$, $2_2$, $2_n$ is configured to have each converter unit $2_1$, $2_2$, $2_n$ generate the corresponding output current $i1_1$, $i1_2$, $i1_n$ such that there is a given phase difference between the phase as represented by the at least one synchronization signal $S_{v1}$, and the phase of its AC output current $i1_1$, $i1_2$, $i1_n$. According to one embodiment, the synchronization signal $S_{v1}$ is in phase with the external AC voltage v1 and the individual output currents $i1_1$, $i1_2$, $i1_n$ are generated to be in phase with the synchronization signal $S_{v1}$ and, therefore, the external AC voltage v1, so that the phase difference is zero. According to another embodiment, the phase difference is not zero. When setting the difference to a value other than zero, reactive power is fed into the power grid. This may help to stabilize the external AC voltage, which is e.g. a power grid.

In FIG. 1, same features of the DC voltage sources $3_1$, $3_2$, $3_n$ have the same reference characters, where the reference characters of the individual DC voltage sources $3_1$, $3_2$, $3_n$ can be distinguished from each other by subscript indices "1", "2", "n". Equivalently, same features of the converter units $2_1$, $2_2$, $2_n$ have the same reference characters that can be distinguished by subscript indices, "1" for the first converter unit $2_1$, "2" for the second converter unit $2_2$ and "n" for the n-th converter unit $2_n$. In the following, when explanations equivalently apply to each of the DC sources $2_1$, $2_2$, $2_n$ or to each of the converter units $2_1$, $2_2$, $2_n$, reference characters will be used without indices. In the following, reference character 2, for example, represents an arbitrary one of the converter units, reference character 23 represents a first output terminal of an arbitrary one of the converter units, reference character i1 denotes the output current of an arbitrary converter unit 2, reference character denotes the output capacitance C of an arbitrary converter unit 2, and so on.

The power converter of FIG. 1 includes n=3 converter units 2. However, having n=3 converter units is only an example. Any number of n converter units 2, wherein n>1, can be connected in series to form the power converter circuit 1.

Besides the internal control loops of the converter units 2 the power converter circuit 1 does not require an outer control loop connected to the individual converter units 2 and/or additional communication paths between the individual converter units 2, when the power converter circuit 1 is in the steady state. When the power converter circuit 1 is in the steady state the system can be defined by equation (1) and one further equation for each of the converter units 2:

$$v2_{RMS} \cdot i1_{RMS} = V3 \cdot I3 \quad (2),$$

where v2rms denotes the RMS (route mean square) value of the output voltage v2 of one converter units 2, $i1_{RMS}$ denotes the RMS value of the output current i1 of one converter unit, V3 denotes the input voltage and I3 denotes the input current of the converter unit 2. It should be noted that (very low) losses may occur in each converter unit 2. For the sake of simplicity, these losses are not considered in equation (2). In the steady state, the RMS values of the individual output currents $i1_{RMS}$ are equal and correspond to the rms value of the power converter circuit output current $i_{OUT-RMS}$, that is:

$$i1_{RMS} = i1_{OUT-RMS} \quad (3)$$

Since equations (2) and (3) is valid for each of the individual converter units, there are n equations, each of these equations describing the relationship between the input power and the average output power of each of the converter units 2, where the input power Pin is given as $$Pin = V3 \cdot I3 \quad (4),$$

and the output power Pout is given as $$Pout = v2_{RMS} \cdot i1_{RMS} \quad (5).$$

The input power Pin of each of the individual converter units 2 and the input voltage V3 and the input current I3, respectively, are external parameters given by the individual DC power sources 3. The external AC voltage v1 between the output terminals 11, 12 is defined by the power grid.

Thus, there are n+1 variables in the power converter circuit 1, namely the n output voltages v2 of the individual converter units 2 and the (equal) output currents i1. However, referring to equations (1) and (2) the system is defined by n+1 equations, so that each of the n+1 variables is determined when the system is in its steady state. Besides having each of the converters 2 generate its AC output current i1 such that there is a given phase difference (such as zero) between the AC output current i1 and the external AC voltage no additional control or regulation mechanism is required. When the output currents i1 of the individual converter units 2 are in phase with the external AC voltage v1 the real output power of each converter unit equals the apparent output power, so that the reactive output power is zero. The individual converter units 2 control their output currents i1 dependent on the phase information as represented by the at least one synchronization signal $S_{v1}$ and control their output current such that the input power received at the input terminals 21, 22 equals the output power at the output terminals 23, 24.

Figure 2A:
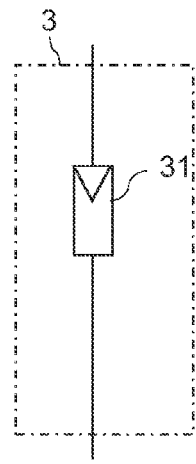
FIGS. 2A-2C illustrates different embodiments of photovoltaic arrays, each including at least one solar cell.
Figure 2B:
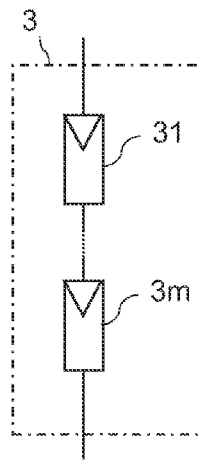
Figure 2C:
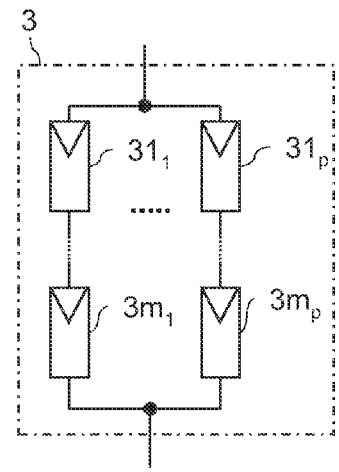

The DC power sources 3 implemented as PV arrays are only schematically illustrated in FIG. 1. These PV arrays each include at least one solar cell. Some exemplary embodiments of PV arrays including at least one solar cell are illustrated in FIGS. 2A to 2C. FIG. 2A illustrates a first embodiment. In this embodiment, the PV array 3 includes only one solar cell 31. Referring to a further embodiment illustrated in FIG. 2B, one PV array 3 includes a string of m solar cells $31_1$, $3m$ wherein m>1, connected in series. According to yet another embodiment illustrated in FIG. 2C, p strings of solar cells are connected in parallel, wherein p>1. Each of the strings includes m solar cells $31_1$, $3m_1$, $31_p$, $3m_p$. However, the embodiments illustrated in FIGS. 2A to 2C are only exemplary. Many other solar cell arrangements may be used as well as a DC source 3.

Figure 3:
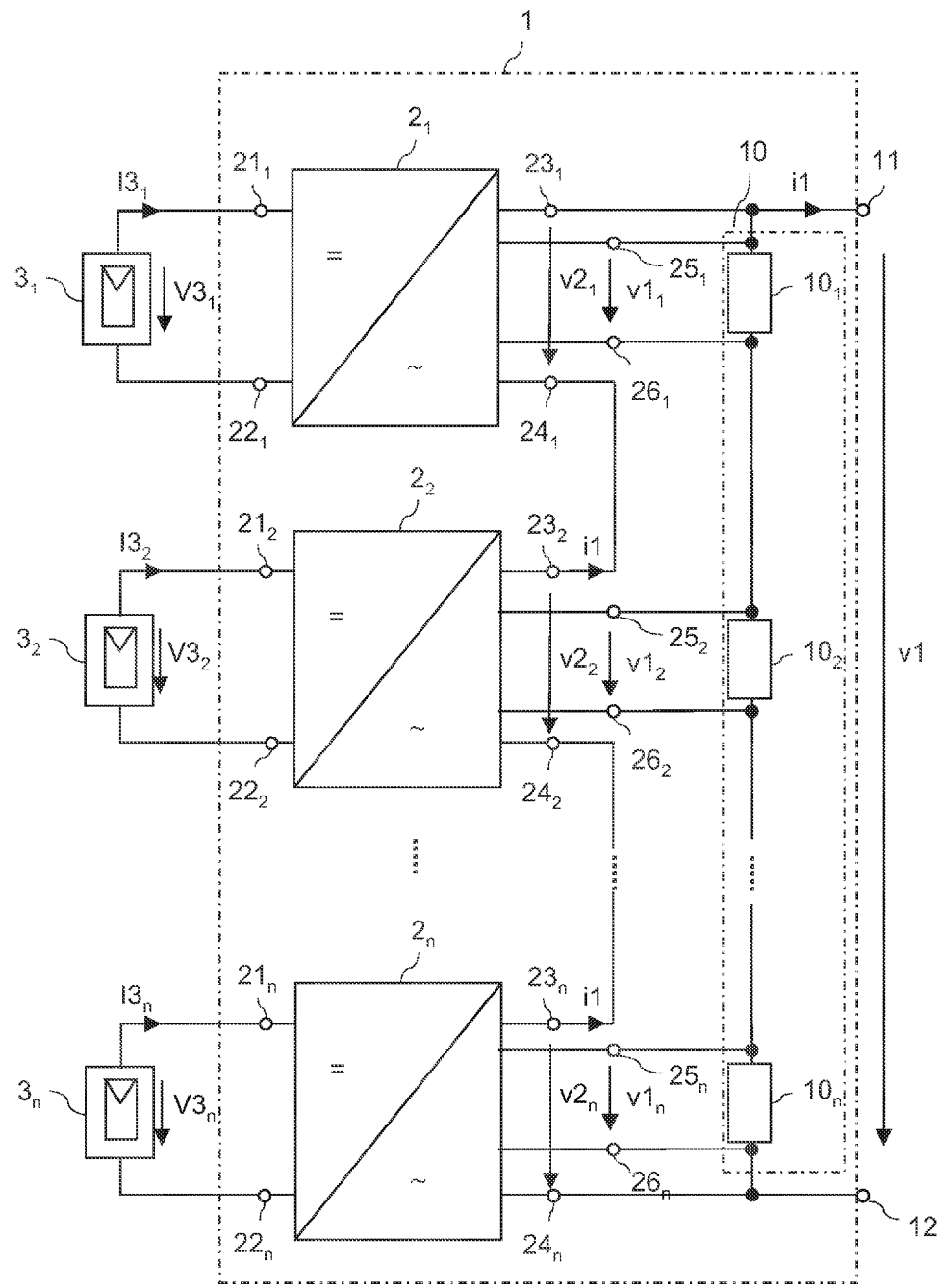
FIG. 3 schematically illustrates a power converter circuit including a plurality of DC/AC converter units connected in series and a voltage measurement circuit including a plurality of measurement units connected in series.

FIG. 3 illustrates an embodiment of a power converter circuit that includes a synchronization circuit 10 implemented as a voltage measurement circuit with a plurality of measurement units $10_1$, $10_2$, $10_n$. The individual measurement units $10_1$, $10_2$, $10_n$ are connected in series between the output terminals 11, 12. For simplicity of the illustration, the output capacitances ($C_1$-$C_n$ in FIG. 1) are not illustrated in FIG. 3. The plurality of measurement units $10_1$, $10_2$, $10_n$ forms a voltage divider, wherein a voltage drop $v1_1$, $v1_2$, $v1_n$ across each of the measurement units $10_1$, $10_2$, $10_n$ is a function of the external AC voltage v1 and includes an information on the frequency and the phase of the external AC voltage v1. In this embodiment, each converter unit $2_1$, $2_2$, $2_n$ has a synchronization input with two input terminals $25_1$, $26_1$, $25_2$, $26_2$, $25_n$, $26_n$, and each converter unit $2_1$, $2_2$, $2_n$ has the synchronization input terminals coupled to one measurement unit $10_1$, $10_2$, $10_n$, so as to receive one measurement voltage $v1_1$, $v1_2$, $v1_n$ as the synchronization signal.

In the embodiment illustrated in FIG. 3, the number of measurement units $10_1$, $10_2$, $10_n$ corresponds to the number of converter units $2_1$, $2_2$, $2_n$, so that each measurement unit $10_1$, $10_2$, $10_n$ is associated with one converter unit $2_1$, $2_2$, $2_n$. However, this is only an example. According to a further embodiment (not illustrated) the measurement voltage provided by one measurement unit is received by two or more converter units.

The individual measurement units $10_1$, $10_2$, $10_n$ can be implemented in many different ways. Some examples are explained with reference to FIGS. 4A to 4D below. In these FIGS. 4A to 4D, reference character 10, denotes an arbitrary one of the measurement units $10_1$, $10_2$, $10_n$ illustrated in FIG. 3.

Figure 4A:
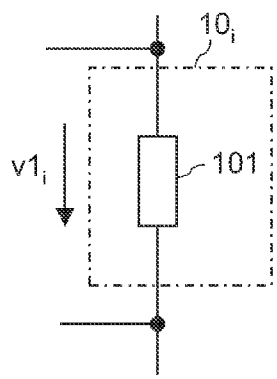
FIGS. 4A-4D illustrates different embodiments of measurement units.
Figure 4B:
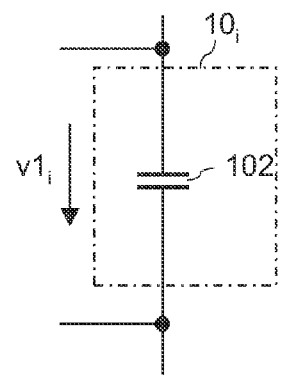

Referring to FIG. 4A, one measurement unit 10i may include a resistor 101 connected between the terminals of the measurement unit 10i that serve to connect the individual measurement units ($10_1$-$10_n$ in FIG. 3) in series and that serve to couple the individual measurement units to the converter units ($2_1$-$2_n$ in FIG. 3). According to one embodiment, the resistances of the resistors 101 in the individual measurement units $10_i$ are equal or at least approximately equal. In this case, the absolute values of the measurement voltages $v1_i$ provided by the individual measurement units $10_i$ are equal. In a measurement circuit 10 that includes measurement units $10_i$ implemented with a resistor 101, the individual measurement voltages $v1_i$ are proportional to the output voltage v1.

In a measurement circuit 10 with measurement units $10_i$ including resistors, the individual measurement units $10_i$ form a resistive voltage divider. Referring to a further embodiment illustrated in FIG. 4B, the individual measurement units $10_i$ each include a capacitor 102 instead of a resistor. In this case, the individual measurement units $10_i$ form a capacitive voltage divider between the output terminals 11, 12.

Figure 4C:
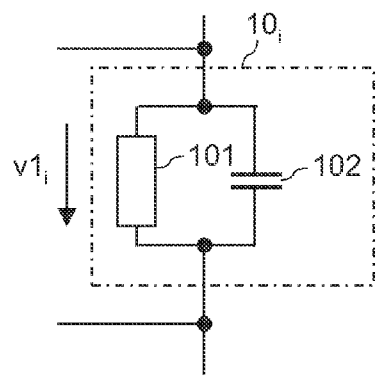

Referring to FIG. 4C, that illustrates a further embodiment, each measurement unit 10i can be implemented with a parallel circuit including a resistor 101 and a capacitor 102.

Figure 4D:
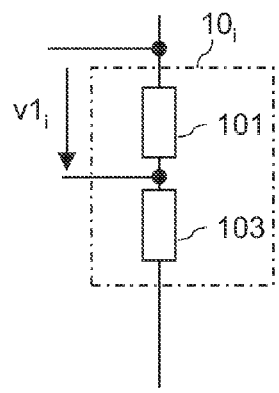

Referring to FIG. 4D, that illustrates yet another embodiment of one measurement unit $10_i$, each measurement unit or at least some of the measurement units can be implemented with a voltage divider having a first voltage divider 101 and a second voltage divider element 102. These voltage divider elements are implemented as resistors in the embodiment according to FIG. 4D. However, these voltage divider elements 101, 102 could also be implemented as capacitors or as combinations with at least one resistor and at least one capacitor. In this embodiment, the measurement voltage $v1_i$ is not the voltage across the measurement unit $10_i$, but is the voltage across the first voltage divider element 101, so that the measurement voltage $v1_i$ is a fraction of the voltage across the measurement unit $10_i$.

It should be noted that implementing the synchronization circuit 10 as a voltage measurement circuit that generates the synchronization signal $S_{v1}$ to be in phase with the external AC voltage v1 is only an example. Examples of other synchronization circuits are explained herein further below.

Figure 5:
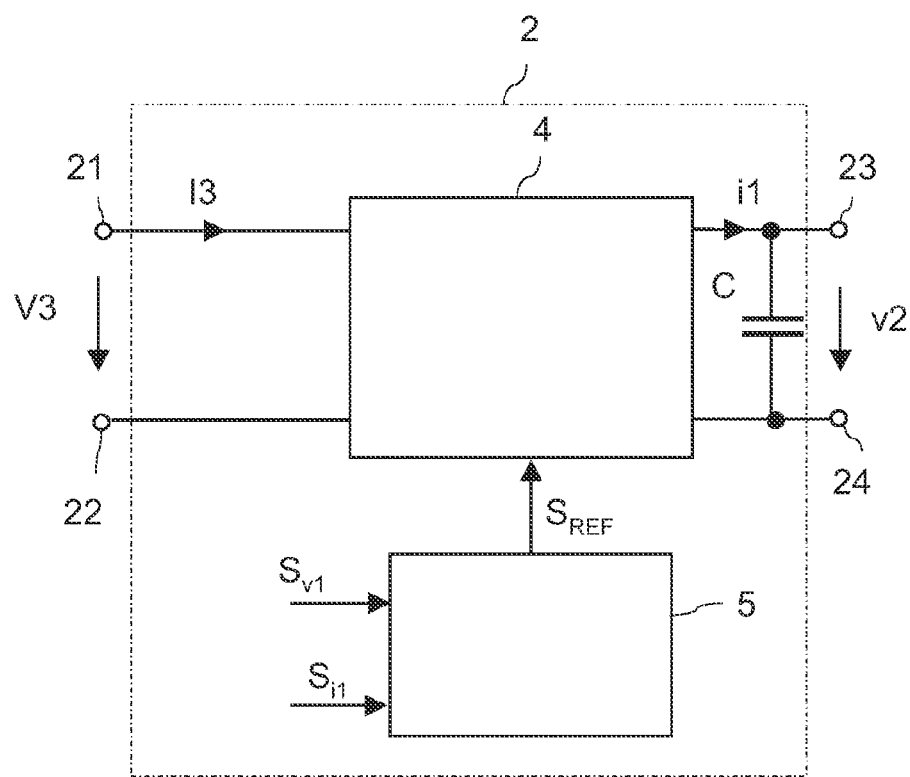
FIG. 5 shows a block diagram illustrating a first embodiment of one DC/AC converter unit, including a DC/AC converter and a control circuit.

FIG. 5 illustrates a first embodiment of a converter unit 2 for converting the DC input voltage provided by one DC source (not shown in FIG. 3) into an AC output voltage v2. The converter unit 2 includes a DC/AC converter 4 connected between the input terminals 23, 22 and the output terminals 23, 24. The DC/AC converter receives the DC voltage V3 provided by the DC power source as an input voltage and the DC supply current I3 of the DC power source as an input current. The DC/AC converter 4 further receives a reference signal $S_{REF}$, which may be an alternating signal having a frequency and a phase. The DC/AC converter 4 is configured to generate the AC output current i1 dependent on the reference signal $S_{REF}$ such that a frequency and a phase of the output current i1 correspond to a frequency and a phase, respectively, of the synchronization signal $S_{v1}$. The DC/AC converter 4 can be implemented like a conventional DC/AC converter that is configured to generate an output current in phase with an alternating reference signal. Such DC/AC converters are commonly known.

It should be noted that each of the DC/AC converter units $2_1$, $2_2$, $2_n$ controls its output current i1 to have a phase and frequency that is dependent on the at least one synchronization signal $S_{v1}$.

The reference signal $S_{REF}$ is generated by a control circuit 5 dependent on the synchronization signal $S_{v1}$ and an output current signal $S_{i1}$. The synchronization signal $S_{v1}$ is either the synchronization signal $S_{v1}$ explained with reference to FIG. 1, one of the measurement voltages $v1_i$ explained with reference to FIG. 3, or a scaled version or a fraction thereof. The output current signal $S_{i1}$ represents the output current i1, i.e. the output current signal $S_{i1}$ is dependent on the output current i1. According to one embodiment, the output current signal $S_{i1}$ is a scaled version of the output current i1. The output current signal $S_{i1}$ can be generated in a conventional manner from the output current i1 using a current measurement circuit (not illustrated). The output current signal $S_{i1}$ is generated for each of the converter units ($2_1$-$2_n$) individually by detecting the respective output current of each converter unit. Referring to FIG. 5, the output current i1 of the illustrated converter unit 2 is the current received at the circuit node common to the first output terminal 23 and the output capacitance C.

The control circuit 5, which will also be referred to as controller in the following, generates the reference signal $S_{REF}$ dependent on the synchronization signal $S_{v1}$ and the output current signal $S_1$ such that the output current, when generated in correspondence with the reference signal $S_{REF}$, is in phase with the external AC voltage v1 or has a given phase shift relative to the external AC voltage v1. It should be noted that, since the external AC voltage v1 and the output current i1 are alternating signals, the synchronization signal $S_{v1}$ and the output current signal $S_{i1}$ are also alternating signals. In the converter unit 2, the DC/AC converter 4 and the controller 5 are part of a control loop that controls the output current i1 to be in phase with the external AC voltage v1 or to have a given phase shift relative thereto.

Although a conventional DC/AC converter may be used in the converter unit 2 as the DC/AC converter 4 connected between the input terminals 21, 22 and the output terminals 23, 24, one example of a DC/AC converter 4 will be explained in detail with reference to FIG. 6, in order to ease understanding of embodiments of the invention.

Figure 6:
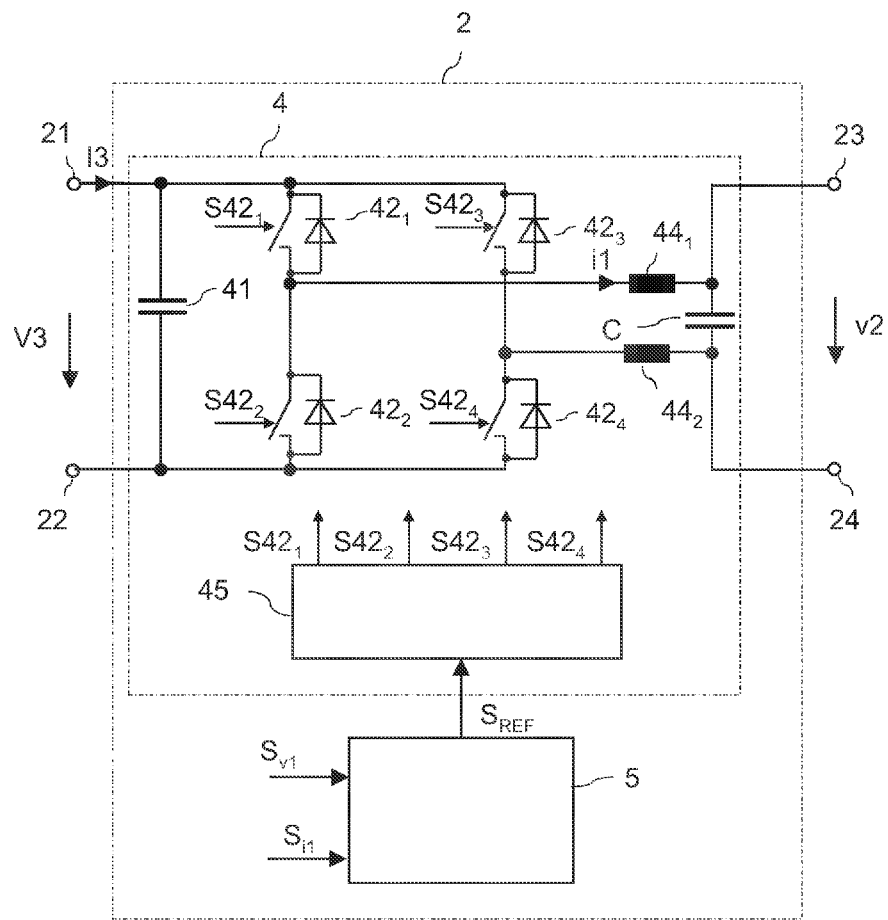
FIG. 6 illustrates an embodiment of the DC/AC converter of FIG. 5 in detail.

The DC/AC converter 4 illustrated in FIG. 6 is a full-bridge (H4) converter with two half-bridge circuits each connected between the input terminals 21, 22. Each of these half-bridge circuits includes two switches each having a load path and a control terminal. The load paths of the two switches of one half-bridge circuit are connected in series between the input terminals 21, 22, where a first switch $42_1$ and a second switch $42_2$ form the first half-bridge, and a third switch $42_3$ and a fourth switch $42_4$ form the second half-bridge. Each of the half-bridges includes an output, where an output of the first half-bridge is formed by a circuit node common to the load paths of the first and second switch $42_1$, $42_2$. An output of the second half-bridge is formed by a circuit node common to the load paths of the third and fourth switches $42_2$, $42_4$. The output of the first half-bridge is coupled to the first output terminal 23 of the converter unit 2 via a first inductive element $44_1$, such as a choke. The output terminal of the second half-bridge is coupled to the second output terminal 24 of the converter unit 2 via a second inductive element $44_2$, such as a choke. According to a further embodiment (not illustrated) only one of the first and second inductive elements $44_1$, $44_2$ is employed. The converter 4 further includes an input capacitance 41, such as a capacitance, connected between the input terminals 21, 22, and the output capacitance C connected between the output terminals 23, 24.

Each of the switches $42_1$, $42_2$, $42_3$, $42_4$ receives a control signal $S42_1$, $S42_2$, $S42_3$, $S42_4$ at its control terminal. These control signals $S42_1$-$S42_4$ are provided by a drive circuit 45 dependent on the reference signals $S_{REF}$ received from the controller 5. The drive signal $S42_1$-$S42_4$ are pulse-width modulated (PWM) drive signals configured to switch the corresponding switch $42_1$-$42_4$ on and off. It should be noted that a switching frequency of the PWM signals $S42_1$-$S42_4$ is significantly higher than a frequency of the alternating reference signal $S_{REF}$. The reference signal $S_{REF}$ may be a sinusoidal signal with a frequency of 50 Hz or 60 Hz, depending on the country in which the power grid is implemented, while the switching frequency of the individual switches $42_1$-$42_4$ may be in the range of several kHz up to several 10 kHz, or even up to several 100 kHz. The drive circuit 45 is configured to individually adjust the duty cycle of each of the drive signals $S42_1$-$S42_4$ between 0 and 1 in order to have the waveform of the output current i1 follow the waveform of the reference signal $S_{REF}$. When the duty cycle of one drive signal is 0, the corresponding switch is permanently switched off, and when the duty cycle of one drive signal is 1, the corresponding switch is permanently switched on. The duty cycle of a drive signal is the relationship between the time period for which the drive signal switches the corresponding switch and the duration of one switching cycle. The duration of one switching cycle is the reciprocal of the switching frequency.

Referring to what has been explained before, the output current i1 is an AC current with a positive half-cycle in which the output current is positive, and with a negative half-cycle in which the output current i1 is negative. The time behavior of the output current i1 is dependent on the reference signal $S_{REF}$ which also has positive and negative half-cycles.

Two possible operating principles of the converter 4 will briefly be explained. First, it is assumed that a positive half-cycle of the output current i1 is to be generated. According to a first operating principle, which is known as bipolar switching or 2-level switching, the first and fourth switches $42_1$, $42_4$ are switched on and off synchronously, while the second and third switches $42_2$, $42_3$ are permanently switched off. During an on-phase of the first and fourth switches $42_1$, $42_4$ an output current i1 is forced through the choke(s) $44_1$, $44_2$ that is dependent on the voltage difference between the input voltage V3 across the input capacitance 41 and the output voltage v2, where the output voltage v2 is defined by the power grid voltage $v_N$. The switches $42_1$-$42_4$ each include a freewheeling element, such as a diode, that is also illustrated in FIG. 4. The freewheeling elements of the second and third switches $42_2$, $42_3$ take the current flowing through the choke(s) $44_1$, $44_2$ when the first and fourth switches $42_1$, $42_4$ are switched off. In this method, the amplitude of the output current i1 can be adjusted through the duty cycle of the synchronous switching operation of the first and fourth switches $42_1$, $42_4$. When the switching frequency of the switches $42_1$, $42_4$ is much higher than the desired frequency of the output current, amplitude, frequency and phase of the AC output current i1 can be adjusted dependent on the reference signal $S_{REF}$ through the duty cycle of the synchronous switching operation of the first and fourth switches $42_1$, $42_4$. During the negative half-cycle the second and third switches $42_2$, $42_3$ are switched on and off synchronously, while the first and fourth switches $42_1$, $42_4$ are permanently off, so that the body diodes of these first and fourth switches $42_1$, $42_4$ are conducting. Alternatively, the switches $42_1$, $42_4$ are switched (with short dead times) when their body diodes are forward biased, so as to be operated as synchronous rectifiers.

According to a second operating principle, which is known as phase chopping or 3-level switching, the first switch $42_1$ is permanently switched on during the positive half cycle of the output voltage v2, the second and third switches $42_2$, $42_3$ are permanently off, and the fourth switch $42_4$ is switched on and off in a clocked fashion. During an on-phase of the first and fourth switches $42_1$, $42_4$ an output current i1 is forced through the choke(s) $44_1$, $44_2$ that is dependent on voltage difference between the input voltage V3 across the input capacitance 41 and the output voltage v2, where the output voltage v2 is defined by the power grid voltage $v_N$. During an off-phase of the fourth switch $42_4$ a freewheeling path is offered by the freewheeling element of switch $42_3$ and the switched-on first switch $42_1$ thus enabling a zero volt state across the output chokes. In this method, the amplitude of the output current i1 can be adjusted through the duty cycle of the switching operation of the fourth switch $42_1$, $42_4$. During the negative half-cycle the first and fourth switches $42_1$, $42_4$ are permanently switched off, the second switch $42_2$ is permanently switched on, and the third switch $42_3$ is switched on and off in a clocked fashion.

In order to control an instantaneous amplitude of the output current i1 during the positive half-cycle, the drive circuit 45 varies the duty cycle of the at least one switch that is switched on and off in a clocked fashion. The duty cycle of the at least one clocked switch and the duty cycle of its drive signal, respectively, is increased in order to increase the amplitude of the output current i1 and is decreased in order to decrease the amplitude of the output current i1. This duty cycle is dependent on the instantaneous amplitude of the reference signal $S_{REF}$.

Figure 7A:
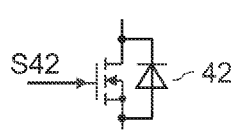
FIGS. 7A to 7C illustrates different embodiments of switches that may be used in the DC/AC converter of FIG. 6.

The switches $42_1$-$42_4$ may be implemented as conventional electronic switches. Referring to FIG. 7A, which illustrates a first embodiment for implementing the switches, the switches may be implemented as MOSFETs, specifically as n-type MOSFETs. Electronic switch 42 in FIG. 7A represents an arbitrary one of the switches $42_1$-$42_4$. A MOSFET, such as the n-type MOSFET illustrated in FIG. 7A has an integrated diode that is also illustrated in FIG. 7A. This diode is known as body diode and may act as a freewheeling element. A drain-source path, which is a path between a drain terminal and a source terminal, forms a load path of a MOSFET, and a gate terminal forms a control terminal.

Figure 7B:
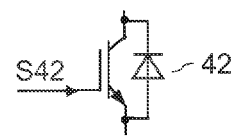

Referring to FIG. 7B, the switches $42_1$-$42_4$ could also be implemented as IGBTs, where additionally a diode may be connected between a collector and an emitter terminal of the IGBT. This diode acts as a freewheeling element. In an IGBT, the load path runs between the emitter and the collector terminal, and the gate terminal forms a control terminal.

According to a further embodiment, two of the four switches, such as the first and third transistors 421, 423 are implemented as SCR Thyristors, while the other two switches are implemented as MOSFET.

Figure 7C:
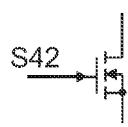

According to yet another embodiment, illustrated in FIG. 7C, the switches 421-424 can be implemented as GaN-HEMTs (Gallium-Nitride High Electron Mobility Transistors). Unlike a conventional (silicon or silicon carbide) MOSFET a GaN-HEMT does not include an integrated body diode. In a GaN-HEMT, a current conduction in a reverse direction (corresponding to the forward direction of a body diode in a conventional MOSFET) can be obtained through a substrate biased turn-on. When implementing the switches in GaN technology, all switches of one converter unit can be implemented on a common semiconductor substrate.

Figure 8:
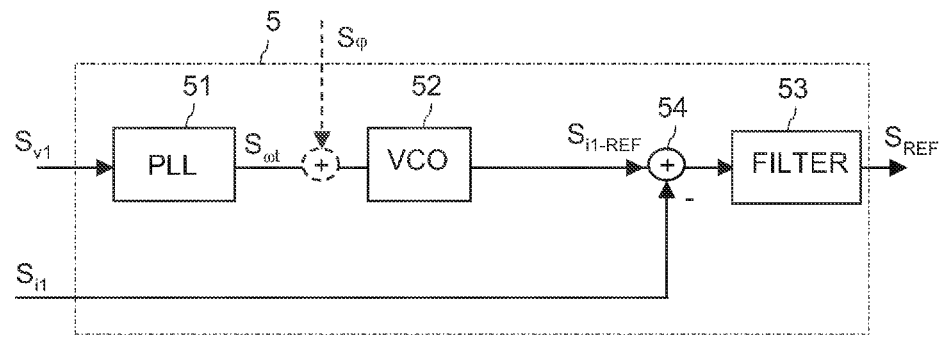
FIG. 8 illustrates a first embodiment of the control circuit of one DC/AC converter unit.

FIG. 8 schematically illustrates an embodiment of the controller 5 that generates the reference signal $S_{REF}$ dependent on the synchronization signal $S_{V1}$ and the output current signal $S_{i1}$. FIG. 8 shows a block diagram of the controller 5 in order to illustrate its operating principle. It should be noted that the block diagram illustrated in FIG. 8 merely serves to illustrate the functionality of the controller 5 rather than its implementation. The individual function blocks, that will be explained in further detail below, may be implemented using a conventional technology that is suitable to implement a controller. Specifically, the function blocks of the controller 5 may be implemented as analog circuits, digital circuits, or may be implemented using hardware and software, such as a microcontroller on which a specific software is running in order to implement the functionality of the controller 5.

Referring to FIG. 8, the controller 5 includes a phase locked loop (PLL) 51 that provides a frequency and phase signal $S_{\omega t}$ representing the frequency and the phase of the synchronization signal $S_{v1}$. Specifically, $S_{\omega t}$ represents an instantaneous phase angle of the (sinusoidal) synchronization signal received at the input of the control circuit 5. Thus, signal $S_{\omega t}$ will also be referred to as phase angle signal in the following. The PLL 51 receives the synchronization signal $S_{v1}$. The frequency and phase signal $S_{\omega t}$ provided by the PLL 51 is received by a signal generator, such as a VCO, that generates a sinusoidal signal $S_{i1\text{-}REF}$ being in phase with the synchronization signal $S_{v1}$ and forming a reference signal for the output current i1 of the converter unit 2.

Referring to FIG. 8, the controller further receives the output current signal $S_{i1}$ and calculates an error signal by subtracting the output current signal Si1 from the output current reference signal $S_{i1\text{-}REF}$. The subtraction operation is performed by a subtractor receiving the output current measurement signal $S_{i1-REF}$ and the output current signal $S_{i1}$ at input terminals and providing the error signal at an output terminal. The error signal, which is also a sinusoidal signal is filtered in a filter 53 connected downstream the subtractor 54. The reference signal $S_{REF}$ is a filtered version of the error signal available at the output of the filter 53. The filter is, e.g., a proportional (P) filter.

Optionally, a phase signal $S_\phi$ is added to the output signal of the PLL 51 before generating the sinusoidal reference signal $S_{i1-REF}$. In this embodiment the reference signal $S_{i1-REF}$ and, therefore, the output current i1, has a phase relative to the synchronization signal $S_{v1}$, with the phase shift being defined by the phase signal $S_\phi$.

Figure 9:
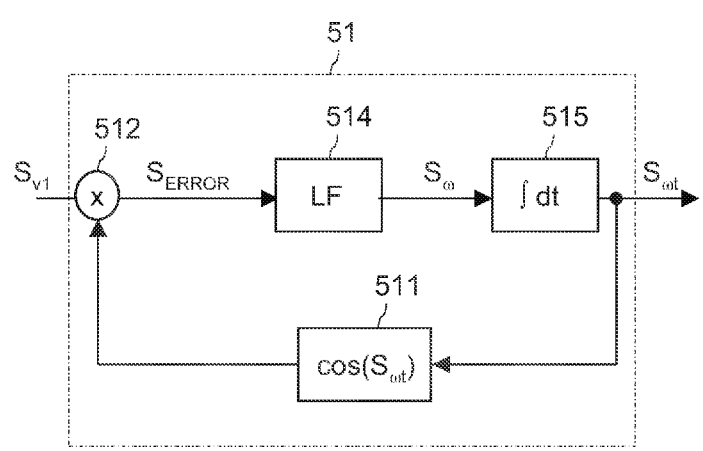
FIG. 9 illustrates a first branch of the control circuit of FIG. 8 in detail.

FIG. 9 illustrates an embodiment of the PLL 51 of FIG. 6. This PLL includes a phase detector with a calculation unit 511 that calculates the sine or the cosine of the phase angle signal $S_{\omega t}$, and multiplier 512 that receives the output signal from the calculation unit 511 and the synchronization signal $S_{v1}$. An error signal $S_{ERROR}$ is available at the output of the multiplier 512. The error signal $S_{ERROR}$ is received by a linear filter (LF) 514, such as, e.g., a linear proportional-integral (PI) filter. In the steady state, an output signal $S_\omega$ of the linear filter represents the frequency of the synchronization signal $S_{v1}$. An integrating circuit (a filter with an integrating (I) characteristic) receives the output signal from the linear filter, integrates the output signal of the linear filter 514 and provides the frequency and phase signal (the phase angle signal) $S_{\omega t}$, from which the VCO (see 52 in FIG. 8) generates the reference signal $S_{i1-REF}$. Integrating the output signal of the linear filter in the time domain corresponds to a multiplication with 1/s in the frequency domain.

Figure 10:
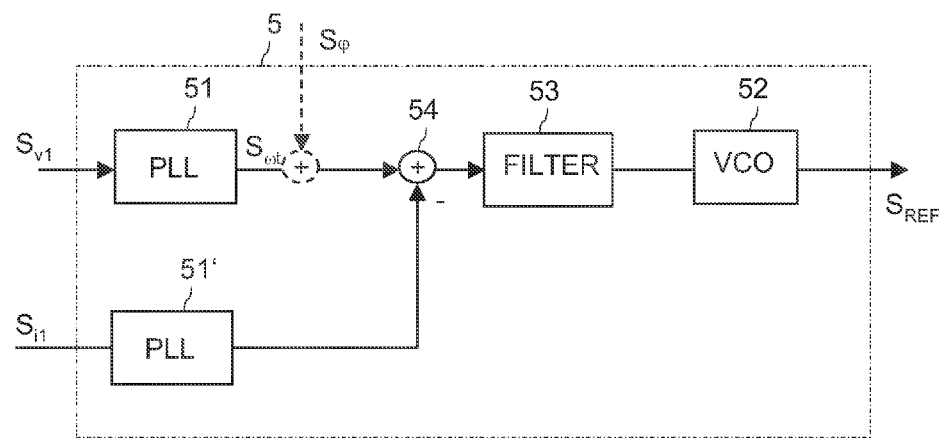
FIG. 10 illustrates a second embodiment of the control circuit of one DC/AC converter unit.

FIG. 10 illustrates a further embodiment of the of the controller 5. In this embodiment, a second PLL 51' receives the output current signal $S_{i1}$ and calculates a further frequency and phase signal representing frequency and phase of the output current signal $S_{i1}$. The further frequency and phase signal is subtracted from the frequency and phase signal $S_{\omega t}$ representing frequency and phase of the synchronization signal $S_{v1}$ (and, optionally, the phase shift $S_\phi$) using a subtractor 54, so as to provide an error signal. The error signal is filtered using a filter 53 and a signal generator 52, such as a VCO, receives the error signal and generates a sinusoidal reference signal with frequency and phase defined by the filtered error signal. In this embodiment, the filter 53 can be implemented as a P-filter or as a PI-filter.

Figure 11:
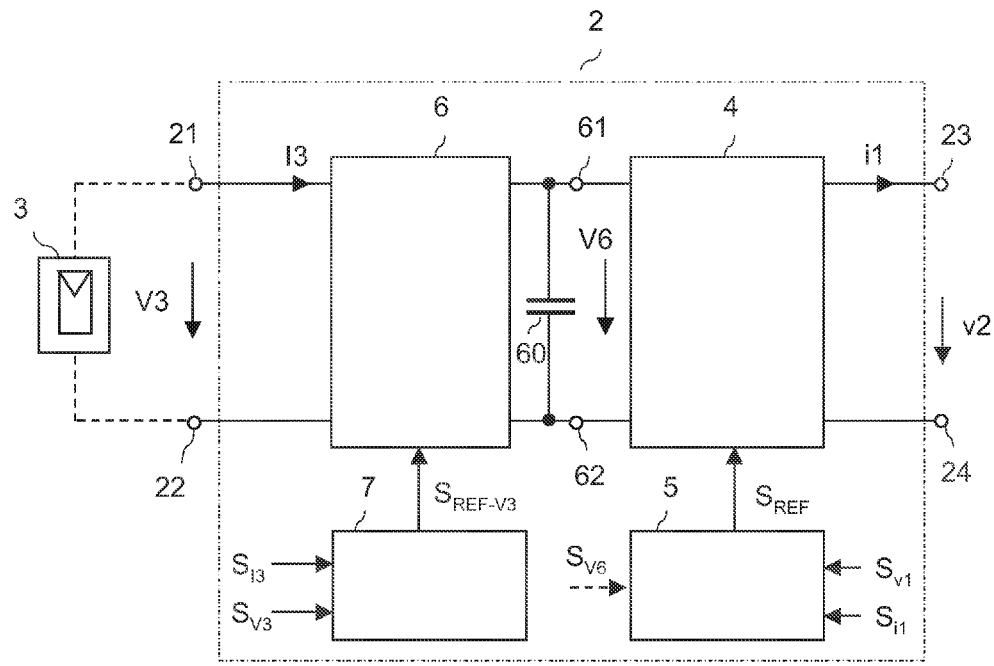
FIG. 11 shows a block diagram illustrating a second embodiment of one converter unit, including a DC/DC converter, a maximum power point tracker, a DC/AC converter, and a control circuit.

FIG. 11 illustrates a further embodiment of one converter unit 2. This converter unit besides the DC/AC converter 4 and the controller 5 includes a DC/DC converter 6 connected between the input terminals 21, 22, and the DC/AC converter 4. The DC/AC converter 4 may be implemented as explained with reference to FIGS. 6 to 10 with the difference that the DC/AC converter 4 of FIG. 11 receives a DC input voltage V6 from the DC/DC converter 6 instead of the input voltage V3 of the converter unit 2. A capacitor 60 connected between the terminals 61, 62 may represent an output capacitor of the DC/DC converter 6 or an input capacitor 4 of the DC/AC converter 4, or both. This capacitor 60 can be referred to as DC link capacitor.

The DC/DC converter 6 is configured to adjust the input voltage V3 or the input current I3 to a voltage or current value, respectively, that is dependent on a reference signal $S_{REF-V3}$ received by the DC/DC converter 6. For explanation purposes it is assumed that the DC/DC converter 6 adjusts the input voltage V3 dependent on the reference signal $S_{REF-V3}$. Adjusting the input voltage V3 of the converter unit 2 may help to operate the DC power source 3 connected to the input terminals 21, 22, in an optimum operating point. This will be explained in the following.

A solar cell and, therefore, a PV module including several solar cells, acts like a power generator providing a DC output voltage and a DC output current when it is exposed to sunlight. For a given light power received by the PV array there is a range of output currents and a range of corresponding output voltages at which the PV array can be operated. However, there is only one output current and one corresponding output voltage at which the electric power provided by the PV array has its maximum. The output current and the output voltage at which the output power assumes its maximum define the maximum power point (MPP). The MPP varies dependent on the light power received by the array and dependent on the temperature.

Referring to FIG. 11, the converter unit 2 further includes a maximum power point tracker (MPPT) 7 that is configured to provide the reference signal $S_{REF-V3}$ such that DC/DC converter 6 adjusts the input voltage such that the DC source 3 is operated in its MPP. The MPPT 7 receives an input current signal $S_{I3}$ that represents the input current I3 provided by the DC source 3 (illustrated in dashed lines in FIG. 9), and an input voltage signal $S_{V3}$ that represents the input voltage V3 provided by the DC source 3. From the input current signal SI3 and the input voltage signal $S_{V3}$ the MPPT 7 calculates the instantaneous input power provided by the DC source 3. The input voltage signal $S_{V3}$ can be obtained from the input voltage V3 in a conventional manner by, for example, using a voltage measurement circuit. Equivalently, the input current signal $S_{I3}$ can be obtained from the input current I3 in a conventional manner using, for example, a current measurement circuit. Those voltage measurement circuits and current measurement circuits are commonly known and are not illustrated in FIG. 11.

The basic operating principle of the MPPT 7 in order to find the MPP is to vary the reference signal $S_{REF-V3}$ within a given signal range and to determine the input power provided by the DC source 3 for each of the input voltages V3 defined by the different reference signals $S_{REF-V3}$. The MPPT 7 is further configured to detect the input voltage V3 for which the maximum input power has been obtained, and to finally set the reference signal $S_{REF-V3}$ to that value for which the maximum input power has been detected.

Since the solar energy received by the PV array 3 may vary the MPPT 7 is further configured to check whether the DC source 3 is still operated in its maximum power point either regularly or when there is an indication that the maximum power point might have changed. An indication that the maximum power point might have changed is, for example, when the input current I3 represented by the input current signal $S_{I3}$ changes without the reference signal $S_{REF-V3}$ having changed. The regular check or the event-driven check of the MPPT 7 whether the DC source 3 is still operated in its maximum power point, may include the same algorithm that has been explained before for detecting the maximum power point for the first time. Conventional algorithms for detecting the maximum power point that can be implemented in the MPPT 7 include, for example, a "hill climbing algorithm" or a "perturb-and-observe algorithm".

Figure 12:
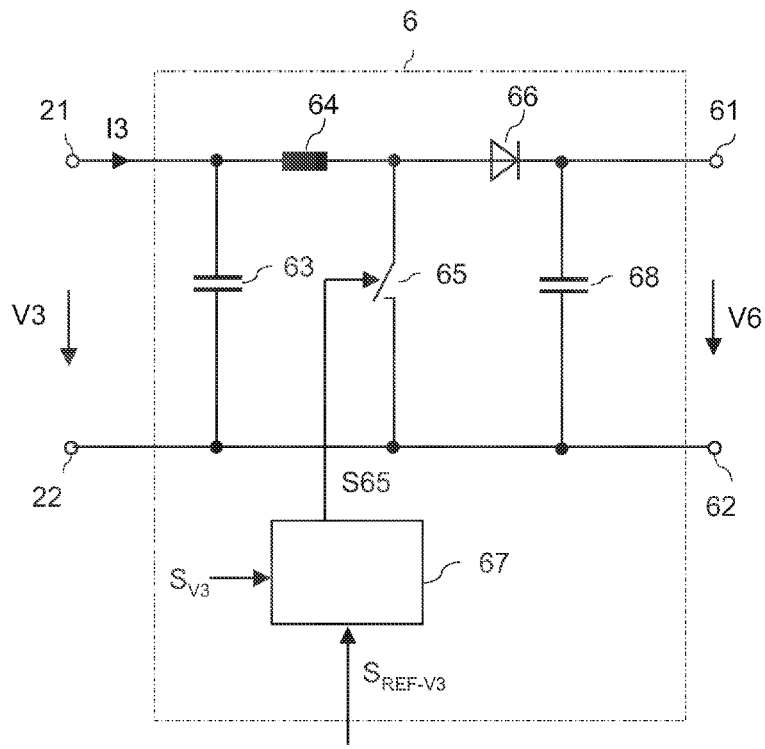
FIG. 12 illustrates an embodiment of the DC/DC converter implemented as a boost converter.

The DC/DC converter 6 can be implemented like a conventional DC/DC converter. A first embodiment of a DC/DC converter 6 that can be used in the converter unit 2 is illustrated in FIG. 12. The DC/DC converter 6 illustrated in FIG. 12 is implemented as a boost converter. This type of converter includes a series circuit with an inductive storage element 64, such as a choke, and a switch 65 between the input terminals of the DC/DC converter 6, where the input terminals of the DC/DC converter 6 correspond to the input terminals 21, 22 of the converter unit 2. Further, a rectifier element 66, such as a diode, is connected between a circuit node common to the inductive storage element 64 and the switch 65 and a first output terminal 61 of the DC/DC converter 6. A second output terminal 62 of the DC/DC converter 6 is connected to the second input terminal 22. An output voltage V6 of the DC/DC converter is available between the output terminals 61, 62. Referring to FIG. 12, the DC/DC converter 6 may further include a first capacitive storage element 63, such as a capacitor, between the input terminals 21, 22, and a second capacitive storage element 68, such as a capacitor, between the output terminals 61, 62. The second capacitive storage element 68 acts as an energy storage that is necessary when generating the AC output current i1 from the DC voltage V6 available at the output of the DC/DC converter 6.

The switch 65 can be implemented as a conventional electronic switch, such as a MOSFET or an IGBT. Further, the rectifying element 66 could be implemented as a synchronous rectifier, which is a rectifier implemented using an electronic switch, such as a MOSFET or an IGBT. According to a further embodiment, the switch 65 is implemented as GaN-HEMT.

The DC/DC converter 6 further includes a control circuit (controller) 67 for generating a drive signal S65 for the switch 65. This drive signal S65 is a pulse-width modulated (PWM) drive signal. The PWM controller 67 is configured to adjust the duty cycle of this drive signal S65 such that the input voltage V3 corresponds to the desired input voltage as represented by the reference signal $S_{REF-V3}$. For this, the control circuit 67 receives the reference signal $S_{REF-V3}$ and the input voltage signal $S_{V3}$ that represents the input voltage V3.

Figure 13:
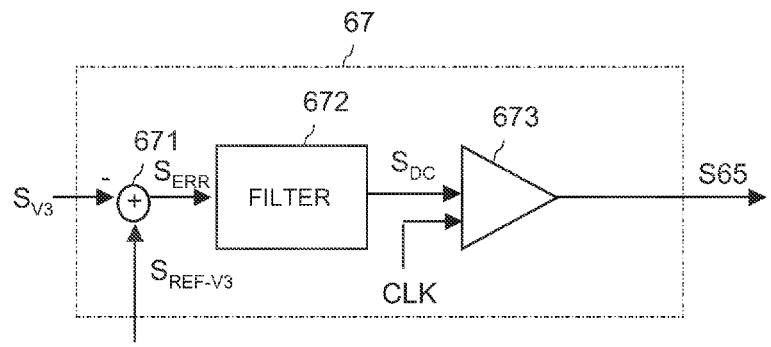
FIG. 13 schematically illustrates a control circuit of the DC/DC converter of FIG. 12.

A first embodiment of the PWM control circuit 67 is illustrated in FIG. 13. Like in FIG. 8 (which illustrates an embodiment of the controller 5) in FIG. 11 functional blocks of the controller 67 are illustrated. These functional blocks can be implemented as analog circuits, as digital circuits or can be implemented using hardware and software. Referring to FIG. 13, the control circuit 67 calculates an error signal $S_{ERR}$ from the input voltage signal $S_{V3}$ and the reference signal $S_{REF-V3}$. The error signal $S_{ERR}$ is calculated by either subtracting the input voltage signal V3 from the reference signal $S_{REF-V3}$ (as illustrated) or by subtracting the reference signal $S_{REF-V3}$ from the input voltage signal $S_{V3}$. The error signal $S_{ERR}$ is provided by a subtraction element 671 that receives the input voltage signal $S_{V3}$ and the reference signal $S_{REF-V3}$.

The error signal $S_{ERR}$ is received by a filter 672 that generates a duty cycle signal $S_{DC}$ from the error signal $S_{ERR}$. The duty cycle signal $S_{DC}$ represents the duty cycle of the drive signal S65 provided by the control circuit 67. The filter 672 can be a conventional filter for generating a duty cycle signal $S_{DC}$ from an error signal $S_{ERR}$ in a PWM controller of a DC/DC converter, such as a P-filter, a PI-filter, or a PID-filter.

A PWM driver 673 receives the duty cycle signal $S_{DC}$ and a clock signal CLK and generates the drive signal S65 as a PWM signal having a switching frequency as defined by the clock signal CLK and a duty cycle as defined by the duty cycle signal $S_{DC}$. This driver 673 can be a conventional PWM driver that is configured to generate a PWM drive signal based on a clock signal and a duty cycle information. Such drivers are commonly known, so that no further information are required in this regard.

The basic control principle of the controller 67 of FIG. 12 will briefly be explained. Assume that the input voltage V3 has been adjusted to a given value represented by the reference signal $S_{REF-V3}$ and that the reference signal $S_{REF-V3}$ changes, so that the input voltage V3 has to be re-adjusted. For explanation purposes it is assumed that the input voltage V3 is to be increased as defined by the reference signal $S_{REF-V3}$. In this case the control circuit 67 reduces the duty cycle of the drive signal S65. Reducing the duty cycle of the drive signal S65 results in a decreasing (average) input current I3, where decreasing the input current I3, at a given power provided by the DC source 3 results in an increasing input voltage V3. Equivalently, the duty cycle is increased when the input voltage V3 is to be decreased. An increase in the duty cycle results in an increase of the input current I3.

The boost converter according to FIG. 12 does not only provide a load to the DC source 3 in order to operate the DC source 3 in its maximum power point. This boost converter also generates an output voltage V6 received by the DC/AC converter 4 (see FIG. 11) that his higher than the input voltage V3. Further, the boost converter is implemented such that the output voltage V6 is higher than a peak voltage of the output voltage v2 of the DC/AC converter, but lower than a voltage blocking capability of the switches (see 42$_1$-42$_4$ in FIG. 6) implemented in the DC/AC converter.

Figure 14:
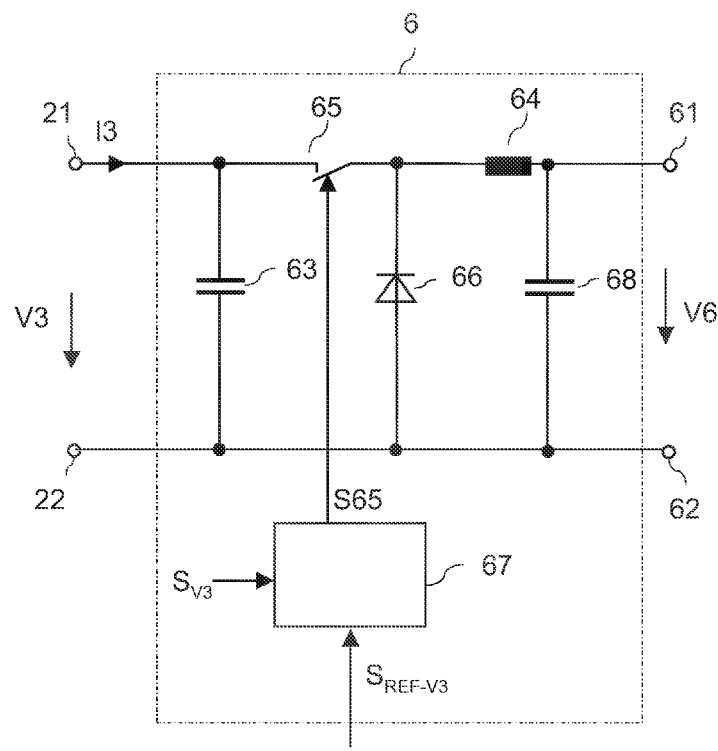
FIG. 14 illustrates an embodiment of the DC/DC converter implemented as a buck converter.

Referring to FIG. 14, the DC/DC converter 6 may also be implemented as a buck converter. This buck converter includes a series circuit with an inductive storage element 64, such as a choke, and a switch 65 between the first input terminal 21 and the first output terminal 61. A freewheeling element 66, such as a diode, is connected between the second output terminal 62 and a circuit node common to the inductive storage element 64 and the switch 65. A capacitive storage element 63, such as a capacitor, is connected between the input terminals 21, 22.

Like in the boost converter of FIG. 12, the switch 65 in the buck converter of FIG. 14 can be implemented as a conventional electronic switch, such as a MOSFET or an IGBT, or could be implemented as a GaN-HEMT. Further, the freewheeling element 66 could be implemented as a synchronous rectifier.

Like in the boost converter according to FIG. 12, the switch 65 in the buck converter according to FIG. 14 is driven by a PWM drive signal S65 provided by a control circuit 67. The control circuit 67 may be implemented as illustrated in FIG. 13. The operating principle of the control circuit 67 in the buck converter of FIG. 14 is the same as in the boost converter of FIG. 12, i.e., the duty cycle of the drive signal S65 is increased when the input voltage V3 is to be decreased, and the duty cycle is decreased, when the input voltage V3 is to be increased.

It should be noted that implementing the DC/DC converter 6 as a boost converter (see FIG. 12) or as a buck converter (see FIG. 14) is only an example. The DC/DC converter 6 could also be implemented as a buck-boost converter, a boost-buck-converter, a flyback converter, and so on. Whether a boost converter or a buck converter is used as a DC/DC converter for tracking the maximum power point of the DC source 3 and for providing the input voltage V6 to the DC/AC converter 4, influences the number of converter units 2 to be connected in series in order for the sum of the output voltages v2 of the converter units 2 to correspond to the external AC voltage v1. This will be explained by the way of an example in the following.

Assume that there is an external AC voltage v1 with 240V$_{RMS}$ is desired. The peak voltage (maximum amplitude)

of this voltage v1 is 338V (240V·sqrt(2), where sqrt is the square root). Further assume that the DC sources 3 are PV arrays each providing an output voltage between 24V and 28V when exposed to sunlight. The DC/AC converter 4 has a buck characteristic, which means that the peak value of the output voltage v2 (see FIG. 4) is less than the received DC input voltage V3 or V6, respectively. Thus, when buck converters are employed as DC/DC converters 6 in the converter units 2 or when no DC/DC converters are used, at least 15 converter units 2 with PV panels connected thereto need to be connected in series. This is based on the assumption that each PV array generates a minimum voltage of V3=24V and that a peak voltage of the external AC voltage v1 is 338V. The number of 15 is obtained by simply dividing 338V through 24V (338V/24V=14.08) and rounding the result to the next higher integer.

When, however, a boost converter is used as the DC/DC converter 6 that, for example, generates an output voltage V6=60V from the input voltage V3 (which is between 24V and 28V) the number of converter units 2 to be connected in series may be reduced to about 6.

In the DC/AC converter illustrated in FIG. 11, the output voltage V6 of the DC/DC converter may vary dependent on the input power received at the input terminals 21,22 from the DC source 3 and dependent on the output current i1 or, more exactly, dependent on the average of the output current i1. According to a further embodiment illustrated in FIG. 15, the control circuit 5 is further configured to control the input voltage of the DC/AC converter 4 and the output voltage of the DC/DC converter 6, respectively. For this, the control circuit 5 receives an input voltage signal SV6 that represents the input voltage V6. The control circuit 5 is configured to adjust the input voltage V6 by varying the duty cycle of those switches in the DC/AC converter 4 that are driven in a clocked fashion. The input voltage can be increased by generally decreasing the duty cycle and can be decreased by generally increasing the duty cycle. For this, the control circuit 5 includes a further control loop, where this control loop is slower than the control loop that causes the output current i1 to follow the reference signal $S_{REF}$. This control loop is, for example configured to cause variations of the duty cycle at a frequency of between 1 Hz and 10 Hz.

Figure 15:
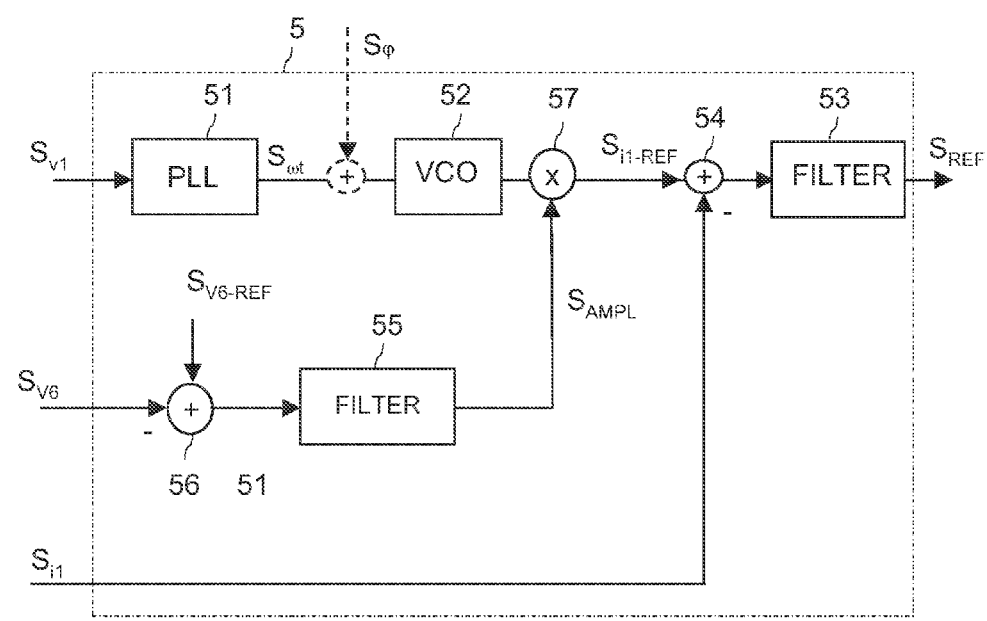
FIG. 15 illustrates a further embodiment of the control circuit of one DC/AC converter.

The control circuit 5 of FIG. 15 is based on the control circuit illustrated in FIG. 8 and additionally includes a further control loop that serves to adjust the amplitude of the output current reference signal $S_{i1-REF}$ dependent on the input voltage signal $S_{V6}$. Instead of the control loop illustrated in FIG. 8, the control circuit according to FIG. 15 could also be implemented based on the control circuit of FIG. 10. Referring to FIG. 15, the control loop includes: a further subtraction element 56, a filter 55, and a multiplier 57. The subtraction element 56 receives the input voltage signal $S_{V6}$ and a reference signal $S_{V6-REF}$ that represents a set value of the input voltage V6. The subtraction element 56 generates a further error signal based on a difference between the input voltage signal $S_{V6}$ and the reference signal $S_{V6-REF}$. The filter 55 receives the further error signal and generates an amplitude signal $S_{AMPL}$ representing an amplitude of the reference signal $S_{REF}$ from the further error signal. The filter may have a P-characteristic, an I-characteristic, a PI-characteristic, or a PID-characteristic. The amplitude signal $S_{AMPL}$ and the output signal of the VCO 52 are received by the multiplier 57 that provides the output current reference signal $S_{i1-REF}$. The output current reference signal $S_{i1-REF}$ has an amplitude that is dependent on the input voltage V6 and that serves to control the input voltage V6 of the DC/AC converter (4 in FIG. 11), and a frequency and phase of the output current i1. The frequency and the phase of the reference signal $S_{REF}$ are dependent on the at least one synchronization signal $S_{v1}$ and the output current signal $S_{i1}$ and serve to adjust frequency and phase of the output current i1 such that there is a given phase difference between the output current and the output voltage.

The input voltage reference signal $S_{V6-REF}$ may have a fixed value that is, selected such that the input voltage V6 is sufficiently below the voltage blocking capability of switches employed in the DC/AC converter. However, it is also possible to vary the input voltage reference signal $S_{V6-REF}$ dependent on the output current, specifically on the rms value of the output current i1. According to one embodiment, the input voltage reference signal $S_{V6-REF}$ decreases when the output current i1 increases, and the input voltage reference signal $S_{V6-REF}$ increases when the output current decreases. According to one embodiment, the input voltage reference signal $S_{V6-REF}$ has a first signal value when the output current i1 is below a given threshold value, and has a lower second signal value when the output current i1 is above a given threshold value.

The control circuit illustrated in FIG. 15 could also be implemented in a converter as illustrated in FIG. 6 in which the DC/DC converter is omitted. In this case, the input voltage to be controlled is the output voltage V3 of the PV module, so that the voltage signal $S_{V6}$ in FIG. 15 is replaced by the voltage signal $S_{V3}$ representing the output voltage of the DC source 3, and the input voltage reference signal $S_{V6-REF}$ is replaced by the reference signal $S_{V3-REF}$ defining a desired output voltage of the DC source 3. The input voltage reference signal $S_{V3-REF}$ may in this case be provided by an MPPT in order to operate the DC source (PV module) 3 in its MPP.

Figure 16:
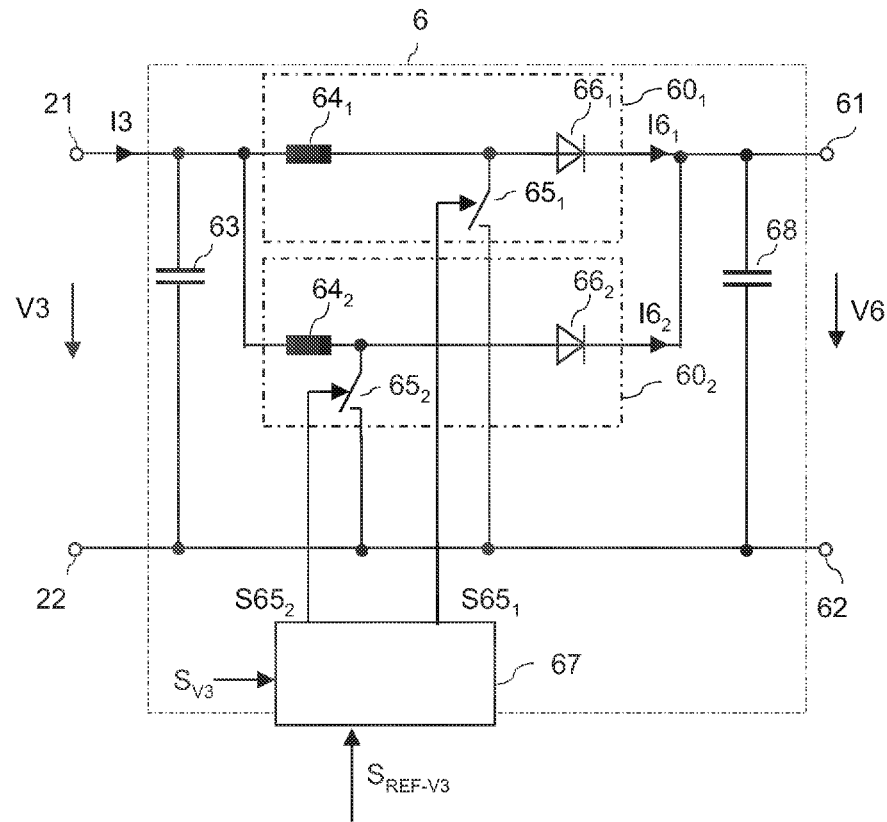
FIG. 16 illustrates an embodiment of the DC/DC converter implemented with two interleaved boost converter stages.

FIG. 16 illustrates a further embodiment of DC/DC converter 6 that can be implemented in a DC/AC converter unit 2 of FIG. 11. The DC/DC converter of FIG. 16 is implemented as a boost converter with two converter stages $60_1$, $60_2$. The two converter stages $60_1$, $60_2$ are connected in parallel between the input terminals 21, 22 and the output terminals 61, 62. Each of the converter units $60_1$, $60_2$ is implemented like the boost converter of FIG. 12 and includes a series circuit with an inductive storage element $64_1$, $64_2$, such as a choke, and a switch $65_1$, $65_2$ between the input terminals of the DC/DC converter 6, where the input terminals of the DC/DC converter 6 correspond to the input terminals 21, 22 of the converter unit 2. Further, each converter stage includes a rectifier element $66_1$, $66_2$ such as a diode, connected between a circuit node common to the corresponding inductive storage element $64_1$, $64_2$ and the corresponding switch $65_1$, $65_2$ and the first output terminal 61 of the DC/DC converter 6. The second output terminal 62 of the DC/DC converter 6 is connected to the second input terminal 22.

The two converter stages $60_1$, $60_2$ share the first capacitive storage element 63 between the input terminals 21, 22, and share the second capacitive storage element 68 between the output terminals 61, 62. The output voltage V6 of the DC/DC converter 6 is available across the second capacitive storage element 68.

Referring to FIG. 16, the control circuit (controller) 67 of the DC/DC converter 6 generates two PWM drive signals $S65_1$, $S65_2$, namely a first drive signal $S65_1$ for the switch $65_1$ of the first converter stage $60_1$, and a second drive signal $S65_2$ for the switch $65_2$ of the second converter stage $60_2$. According to one embodiment, the first and second boost converter stages $60_1$, $60_2$ are operated interleaved, which means that there is a time offset between the switching cycles of the first switch $65_1$ and the switching cycles of the second switch $65_2$. Providing two converter stages $60_1$, $60_2$ and operating these converter stages $60_1$, $60_2$ in an interleaved mode helps to reduce voltage ripples of the input voltage V3 and the output voltage V6 of the DC/DC converter 6. Of course, more than two boost converter stages $60_1$, $60_2$ can be connected in parallel.

Figure 17:
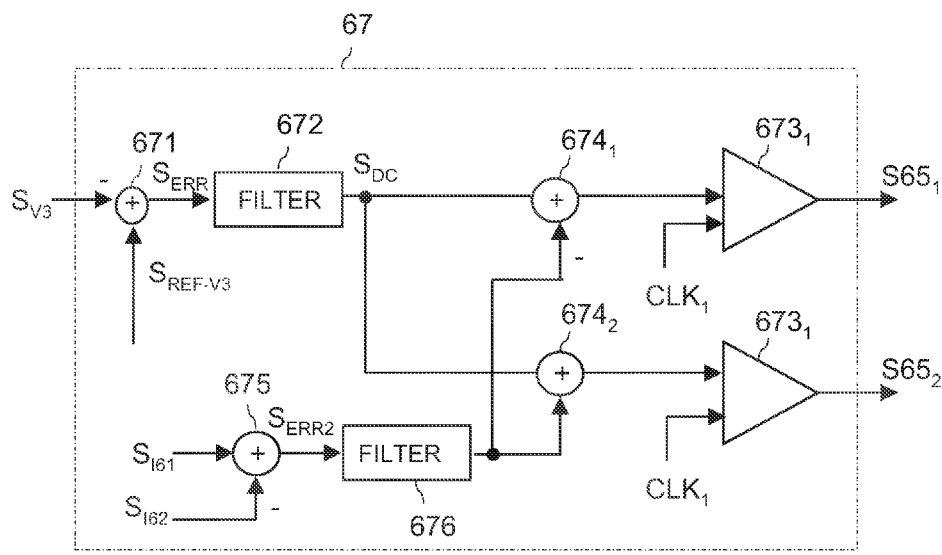
FIG. 17 illustrates a first embodiment of a control circuit for the DC/DC converter of FIG. 16.

Referring to FIG. 16, each boost converter stage $60_1$, $60_2$ provides an output current $I6_1$, $I6_2$. These output currents $I6_1$, $I_{62}$ add and form the overall output current I6 of the DC/DC converter. FIG. 17 illustrates a first embodiment of the controller 67 configured to generate PWM drive signals $S65_1$, $S65_2$ for each converter stage $60_1$, $60_2$, and further configured to generate the PWM drive signals $S65_1$, $S65_2$ such that the output currents $I6_1$, $I6_2$ of the converter stages $60_1$, $60_2$ are balanced.

Referring to FIG. 17 the control circuit 67 is based on the control circuit 67 of FIG. 13 and includes the subtraction element 671 receiving the input voltage signal $S_{V3}$ and the input voltage reference signal $S_{REF-V3}$ and the filter 672 for providing the duty cycle signal $S_{DC}$. The controller 67 of FIG. 17 further includes a first PWM driver $673_1$ receiving a first duty cycle signal $S_{DC1}$ that is dependent on the duty cycle signal $S_{DC}$ provided by the filter 672 and receiving a first clock signal $CLK_1$, and a second PWM driver $673_1$ receiving a second duty-cycle signal $S_{DC2}$ that is dependent on the duty cycle signal $S_{DC}$ provided by the filter 672 and receiving a second clock signal $CLK_2$. According to one embodiment, the first and second clock signals $CLK_1$, $CLK_2$ have the same frequency. However, there is a phase shift between the first and second clock signal $CLK_1$, $CLK_2$, so that there is a phase shift between the first PWM drive signal $S65_1$ provided by the first PWM driver $673_1$ and the second PWM drive signal $S65_2$ provided by the second PWM driver $673_2$.

If the first and second converter stages $60_1$, $60_2$ would perfectly match so that there would be no risk of unbalanced output currents $I6_1$, $I6_2$, the duty cycle signal $S_{DC}$ could be used as the first duty cycle signal $S_{DC1}$ and as the second duty cycle signal $S_{DC2}$. However, due to an inevitable mismatch of the components in the converter stages $60_1$, $60_2$ the output currents $I6_1$, $I6_2$ can be unbalanced when the first and second drive signal $S65_1$, $S65_2$ would be generated with exactly the same duty cycle.

In order to compensate for such unbalances of the first and second output currents $I6_1$, $I6_2$, the controller 67 of FIG. 17 includes an additional control loop, that can be referred to as current balancing loop or power balancing loop. This control loop receives a first output current signal $S_{I61}$ representing the first output current $I6_1$ of the first converter stage $60_1$, and a second output current signal $S_{I62}$ representing the output current $I6_2$ of the second converter stage $60_2$. These output current signals $S_{I61}$, $S_{I62}$ can be generated using conventional current measurement units. The output current signals $S_{I61}$, m $S_{I62}$ are received by a subtraction unit 675 that generates a further error signal $S_{ERR2}$. The further error signal $S_{ERR2}$ is representative of a difference between the first and second output currents $I6_1$, $I6_2$. Further error signal $S_{ERR2}$ is received by a filter 676 that generates a filtered error signal. The filter 676 may have a P-characteristic, a I-characteristic, or a PI-characteristic.

A further subtraction unit $674_1$ subtracts the filtered error signal from the duty cycle signal $S_{DC}$ to generate the first duty cycle signal $S_{DC1}$, and an adder $674_2$ adds the filtered error signal to the duty cycle signal DC to generate the second duty cycle signal $S_{DC2}$.

The operating principle of the controller 67 of FIG. 17 is as follows. When the first and second output currents $I6_1$, $I6_2$ are identical, the further error signal $S_{ERR2}$ is zero. In this case, the first duty cycle signal $S_{DC1}$ corresponds to the second duty cycle signal $S_{DC2}$. When, for example, the first output current $I6_1$ is larger than the second output current $I6_2$, the further error $S_{ERR2}$ and the filtered error signal have a positive value. In this case, the duty cycle signal $S_{DC1}$ (obtained by subtracting the filtered error signal from the duty cycle signal SDC) becomes smaller than the second duty cycle signal $S_{DC2}$ (obtained by adding the filtered error signal to the duty cycle signal $S_{DC}$). Thus, the duty cycle of the first drive signal $S65_1$ becomes smaller than the duty cycle of the second drive signal $S65_2$ in order to reduce the first output current $I6_1$ and to increase the second output current $I6_2$, so as to balance these output currents $I6_1$, $I6_2$.

Figure 18:
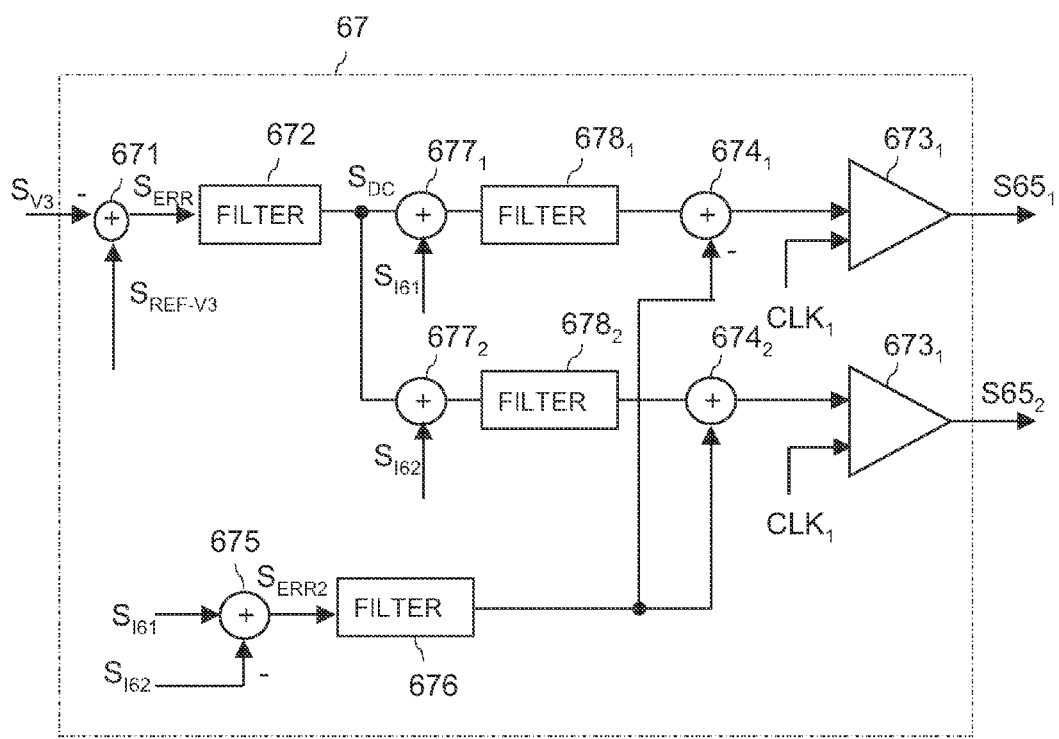
FIG. 18 illustrates a second embodiment of a control circuit for the DC/DC converter of FIG. 16.

FIG. 18 illustrates a further embodiment of the control circuit 67 that is configured to balance the output currents $I6_1$, $I6_2$. The control circuit 67 of FIG. 18 is based on the control circuit 67 of FIG. 17. In the control circuit 67 of FIG. 18, the subtraction unit $674_1$ that generates the first duty cycle signal SDC1 does not receive the duty cycle signal SDC but receives a filtered version of a difference between the duty cycle signal $S_{DC}$ and the first output current signal $S_{I61}$. A subtraction unit $677_1$ calculates the difference and a filter $678_1$, filters the difference. The filter may have a P-characteristic, an I-characteristic or PI-characteristic. Equivalently, the adder $674_2$ that provides the second duty cycle signal $S_{DC2}$ does not receive the duty cycle signal $S_{DC}$ but receives a filtered difference between the duty cycle signal $S_{DC}$ and the second input current signal $S_{I62}$. A subtraction unit $677_2$ calculates the difference between the duty cycle signal $S_{DC}$ and the second output current signal $S_{I62}$, and a filter $678_2$ filters the difference. The output signals of the filter $678_1$, $678_2$ are received by the subtraction unit $674_1$ and the adder $674_2$, respectively.

While in the embodiment illustrated in FIG. 17 a single control loop is employed to regulate the input voltage V3, a dual control loop structure is employed in the embodiment according to FIG. 18.

Figure 19:
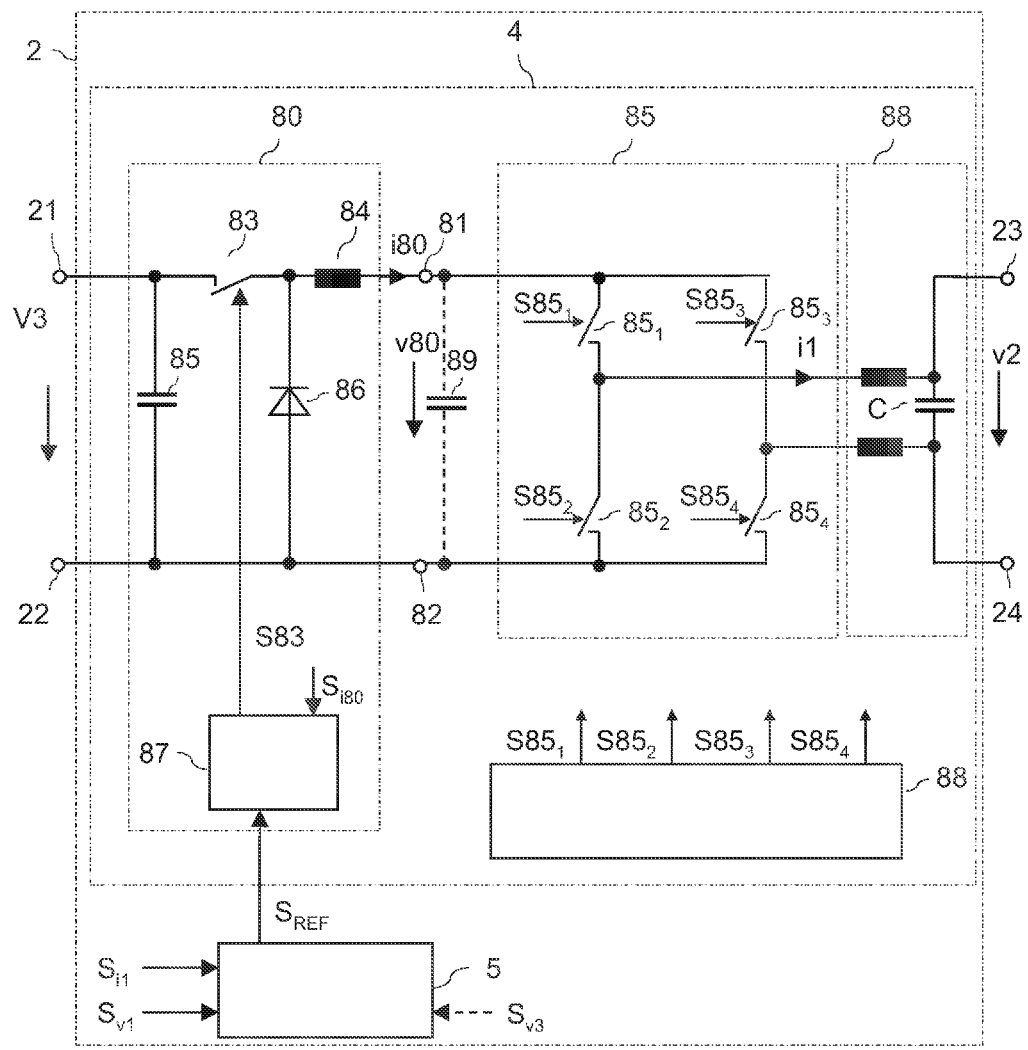
FIG. 19 shows a block diagram illustrating a further embodiment of one DC/AC converter unit including a buck converter and an unfolding bridge.

FIG. 19 illustrates a further embodiment of a converter unit 2 with a DC/AC converter 4. The converter unit 2 may further include a DC/DC converter 6 (see FIG. 9) connected between the input terminals 21, 22 and the DC/AC converter. However, such DC/DC converter is not illustrated in FIG. 13. Dependent on whether or not the converter unit 2 includes a DC/DC converter the DC/AC converter 4 receives the input voltage V3 of the converter unit 2 or the output voltage of the DC/DC converter 4 (not illustrated in FIG. 19) as an input voltage. Just for explanation purposes it is assumed that the DC/AC converter 4 receives the input voltage V3.

Figure 20:
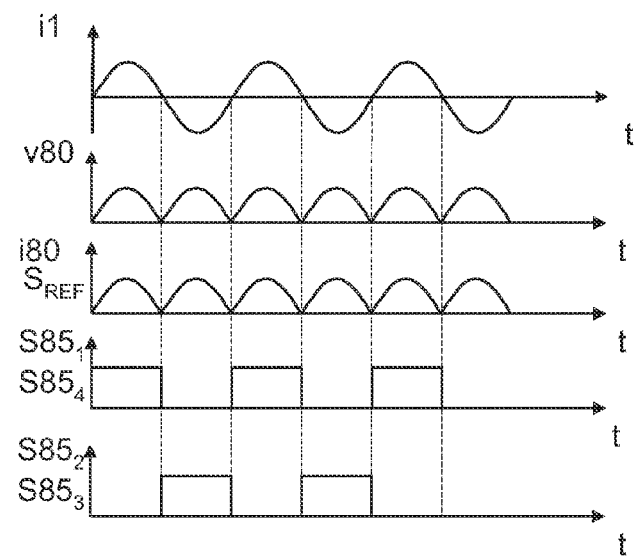
FIG. 20 shows timing diagrams illustrating the operating principle of the DC/AC converter unit of FIG. 19.

The DC/AC converter of FIG. 19 includes a buck converter 80 that receives the input voltage V3 as an input voltage. The buck converter 80 is configured to generate an output current i80 which is a rectified version of the output current i1 of the DC/AC converter 4. Assume, for example that a desired waveform of the output current i1 is a sinusoidal waveform. In this case, the output current i80 provided by the converter 80 has the waveform of a rectified sinusoidal curve or the waveform of the absolute value of a sinusoidal curve, respectively. This is schematically illustrated in FIG. 20, in which exemplary timing diagrams of a sinusoidal output current i1 and the corresponding output current i80 of the converter 80 are illustrated.

The output current i1 of the DC/AC converter 4 is produced from the output current i80 of the buck converter 80 using a bridge circuit 85 with two half-bridges, where each of these half-bridges is connected between output terminals 81, 82 of the buck converter 80. This bridge circuit 85 can be referred to as unfolding bridge. A first half-bridge includes a first and a second switch $85_1$, $85_2$ connected in series between the output terminals 81, 82, and a second half-bridge includes a third switch $85_3$ and a fourth switch $85_4$ connected in series between the output terminals 81, 82. An output terminal of the first half-bridge, which is a circuit node common to the first and second switches $85_1$, $85_2$ is coupled to the first output terminal 23. An output terminal of the second half-bridge, which is a circuit node common to the third and fourth switch $85_3$, $85_4$ is coupled to the second output terminal 24 of the converter unit 2. Optionally, an EMI filter 88 with two inductances, such as chokes, is coupled between the output terminals of the half-bridges and the output terminals 23, 24 of the converter unit 2. The output capacitance C of the converter unit 2 that is connected between the output terminals can be part of the EMI filter 88.

Referring to FIG. 19, the output current i80 of the buck converter 80 has a frequency which is twice the frequency of the output current i1. A switching frequency of the switches $85_1$-$85_4$ of the bridge circuit 85 corresponds to the frequency of the output current i1. During a positive half-cycle of the output current i1 the first and fourth switch $85_1$, $85_4$ are switched on, and during a negative half-cycle of the output voltage v2 the second and third switches $85_2$, $85_3$ are switched on. The switches of the bridge circuit 85 are driven by drive signals $S85_1$-$S85_4$ generated by a drive circuit 88. Timing diagrams of these drive signals $S85_1$-$S85_4$ are also illustrated in FIG. 20. In FIG. 20, a high signal level of these timing diagrams represents an on-level of the corresponding drive signal $S85_1$-$S85_4$. An on-level of the drive signal is a signal level at which the corresponding switch is switched on. The drive signals $S85_1$-$S85_4$ may, for example, be generated dependent on the output voltage v80 of the buck converter 80, where, according to one embodiment, drive circuit 88 changes the switching state of the switches each time the output voltage v80 has decreased to 0. "Changing the switching state" means either switching the first and the fourth switches $85_1$, $85_4$ on and the other two switches off, or means switching the second and the third switch $85_2$, $85_3$ on and the other two switches off.

The buck converter 8 may have a conventional buck converter topology and may include a switch 83 connected in series with an inductive storage element 84, where the series circuit is connected between the first input terminal 21 of the converter unit 2 or the first output terminal 61 of a DC/DC converter (not shown), and the first output terminal 81 of the buck converter 80, respectively. A rectifier element 86 is connected between the second output terminal 82 (corresponding to the second input terminal 22) of the buck converter and a circuit node common to the switch 83 and the inductive storage element 84. The switch 83 can be implemented as a conventional electronic switch, such as a MOSFET or an IGBT, or as a GaN-HEMT. The rectifier element 86 can be implemented as a diode or as a synchronous rectifier. Further, a capacitive storage element 85, such as a capacitor, is connected between the input terminals of the buck converter 80, and an optional smoothing capacitor 89 is connected between the output terminals 81, 82.

The switch 83 of the buck converter 80 is driven by a PWM drive signal S83 generated by a control circuit or controller 87. The controller 87 of the buck converter 80 receives the reference signal $S_{REF}$ from the controller 5 of the converter unit 2. The controller 87 of the buck converter 80 is configured to generate its output current i80 in correspondence with the reference signal $S_{REF}$. This reference signal $S_{REF}$ according to FIG. 19, unlike the reference signal $S_{REF}$ of FIG. 11, does not have the waveform of the output current i1, but has the waveform of the rectified output current i1. This reference signal $S_{REF}$ is also generated from the synchronization signal $S_{v1}$ and the output current signal $S_{i1}$.

Figure 21:
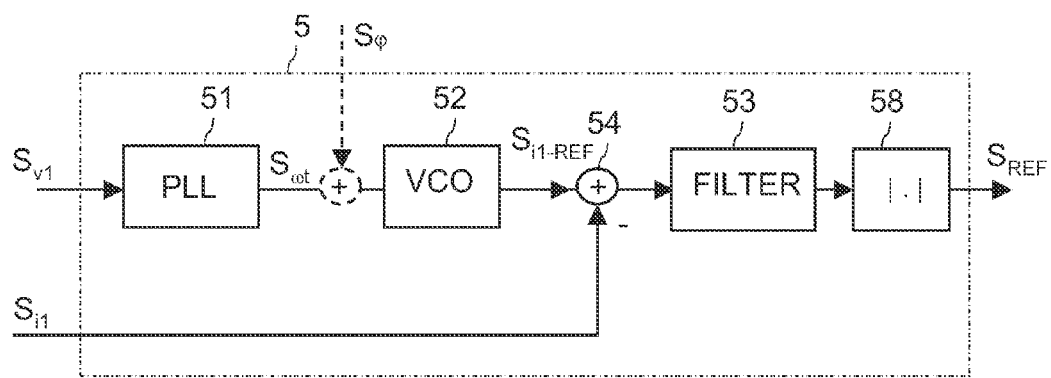
FIG. 21 illustrates a first embodiment of a controller implemented in the DC/AC converter unit of FIG. 19.

The controller 5 for generating the reference signal $S_{REF}$ according to FIG. 19 may correspond to the controllers illustrated in FIGS. 8 and 15 with the difference that the oscillating signal provided at the output of the oscillator 53 is rectified. An embodiment of the controller 5 according to FIG. 19 is illustrated in FIG. 21. This controller 5 corresponds to the controller according to FIG. 8 with the difference that the output signal of the filter 53 is received by a rectifier 58 that generates a rectified version of the oscillating output signal of the oscillator 53. Mathematically this is equivalent to forming the absolute value of the oscillating output signal of the oscillator 53. The reference signal $S_{REF}$ is available at the output of the rectifier 58.

Figure 22:
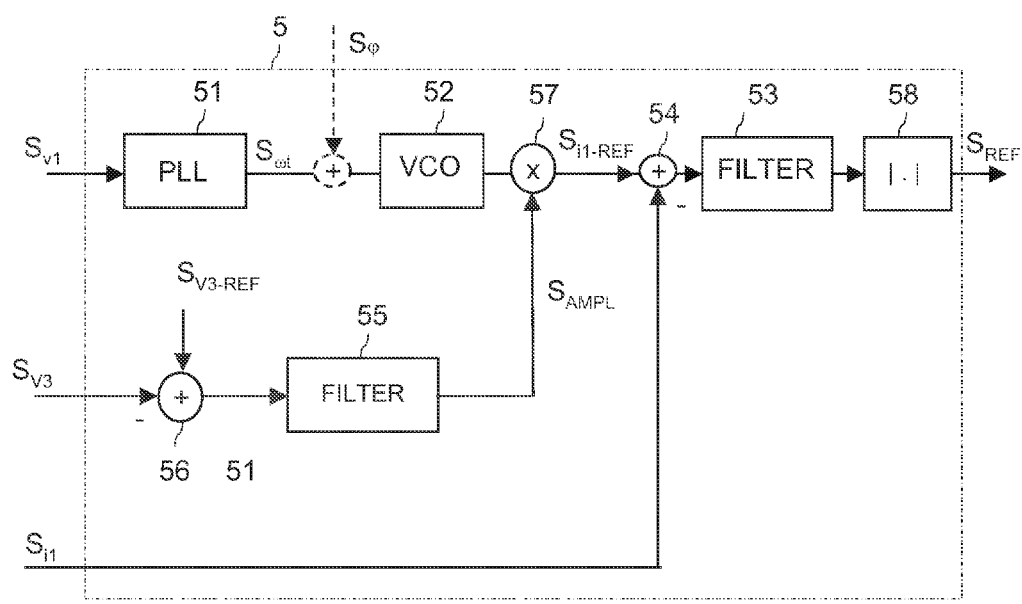
FIG. 22 illustrates a second embodiment of a controller implemented in the DC/AC converter unit of FIG. 19.

FIG. 22 illustrates a further embodiment of a controller 5 that can implemented in the DC/AC converter 4 of FIG. 19. The controller 5 of FIG. 22 is based on the controller 5 of FIG. 15 with the difference that the amplitude signal $S_{AMPL}$ is generated from the input voltage signal $S_{V3}$ voltage signal $S_{V3}$ that represents the input voltage V3 provided by the DC source 3, and from the input voltage reference signal $S_{REF-V3}$. The input voltage reference signal $S_{REF-V3}$ can be generated by an MPPT, such as an MPPT 7 explained with reference to FIG. 11.

The control loops illustrated in FIGS. 15, 21 and 22 could, of course, be amended to be based on the control loop structure of FIG. 10 instead of FIG. 8.

Referring to FIG. 19, the controller 87 of the buck converters 80 can be implemented like a conventional controller for providing a PWM drive signal in a buck converter. The controller 86 receives the reference signal $S_{REF}$ and an output current signal Si80, where the output current signal $S_{i80}$ represents the output current vi80 of the buck converter 80. The controller 86 is configured to vary the duty cycle of the drive signal S83 such that the output current i80 of the buck converter 80 is in correspondence with the reference signal $S_{REF}$. The functionality of this controller 86 corresponds to the functionality of the controller 67 illustrated in FIG. 13. In the embodiment illustrated in FIG. 19 the controller receives the output current signal $S_{i1}$ representing the output current i1 and the synchronization signal $S_{v1}$ for generating the reference signal $S_{REF}$. However, this is only an example. It would also be possible to generate the reference signal $S_{REF}$ based on signals representing the output voltage v80 and the output current i80 of the buck converter 80. In this case, the reference signal is generated such that output current i80 and the output voltage v80 of the buck converter 80 have a given phase difference.

The operating principle of a power converter circuit 1 including DC/AC converters as illustrated in FIG. 19 will now be explained with reference to FIGS. 1 and 19. The explanation will be based on the assumption that the voltage of the power grid 100 is a sinusoidal voltage so that an output current i1 with a sinusoidal waveform is desired. Further, it is assumed that the input powers of the individual DC/AC converters is zero, while the power grid voltage $v_N$ is applied to the input terminals 11, 12 and the bridge circuits 85 in the individual converter units are in operation. In this case, the smoothing capacitors 89 of the buck converters are connected in series between the output terminals 11, 12.

When the individual capacitors 89 have the same size, the voltage across each of these capacitors 89 is 1/n times the power grid voltage $v_N$.

Assume now that the DC/AC converters receives an input power from the PV modules 3 connected thereto. The DC/AC converters then adjust their common output current i1 to be in phase with the external voltage v1 (the power grid voltage). The amplitude of the output current i1 is, in particular, controlled through the input voltage V3, where the current is increased when the voltage V3 increases, and the current is decreased when the voltage V3 decreases.

When the output current i1 provided by one DC/AC converter decreases, a current that corresponds to a difference between the output current i1 and the common current i1OUT is provided by the output capacitor C which causes the voltage v2 across the output capacitor C to decrease until the input power provided to the DC/AC converter corresponds to its output power. A decrease of the voltage v2 across the output capacitor 89 of one DC/AC converter 4 or one converter unit 2 causes an increase of the voltages across the output capacitors of the other converter units. This process proceeds until the converter unit 2 has settled in stable operation point at a lower output current i1. If the other converter units 2 at first continue to run at the same duty cycle, the increase of the voltages across their output capacitors leads to a reduction of their output currents i1 (and hence to a reduction of the common output current) in order to keep their output powers equal their input powers. When the output current i1 provided by one DC/AC converter increases so as to be higher than the common current i1$_{OUT}$, the corresponding output capacitor C is charged which results in an increase of the voltage across the output capacitor C of the one converter and a decrease of the voltage across the output capacitors of the other converters.

It became obvious from the explanation provided before that besides the control loops in the individual converter units 2 no additional control loop is required in order to control the output voltages of the individual converter units 2. The power converter circuit 1 with the converter units 2 is "self organizing". Referring to FIG. 1, assume that, for example, in the steady state the input power provided by the first DC source $3_1$ to the first converter unit $2_1$ would drop, for example because the corresponding PV array is shaded. The output voltage v$2_1$ of the corresponding converter unit 2 would then drop, while the output voltages of the other converter units $2_2$, $2_n$ would increase in order to meet the condition defined by equation (1). Further, the common output current i1$_{OUT}$ would decrease. The transient process is as follows: When the input power received by the first converter unit $2_1$ decreases, the common output current i1$_{OUT}$ at first remains unchanged, while the output current i1$_1$ of the first converter unit $2_1$ decreases. The decrease of the output current i11 and the unchanged common output current i$_{OUT1}$ causes a discharging of the output capacitor C$_1$ of the first converter unit $2_1$ so that the output voltage v$2_1$ decreases. A decrease of the output voltage of the first converter unit, however, causes an increase of the output voltages of the other converters, which now decrease their output currents in order to keep their output powers equal their input powers. The transition processes finishes when a "new" common output current i$_{OUT}$ has settled in to which the individual output currents i1 correspond. This is a self-organizing and self-stabilizing process that does not require and additional control loop besides the control loops in the individual converter units 2 disclosed before.

Figure 23:
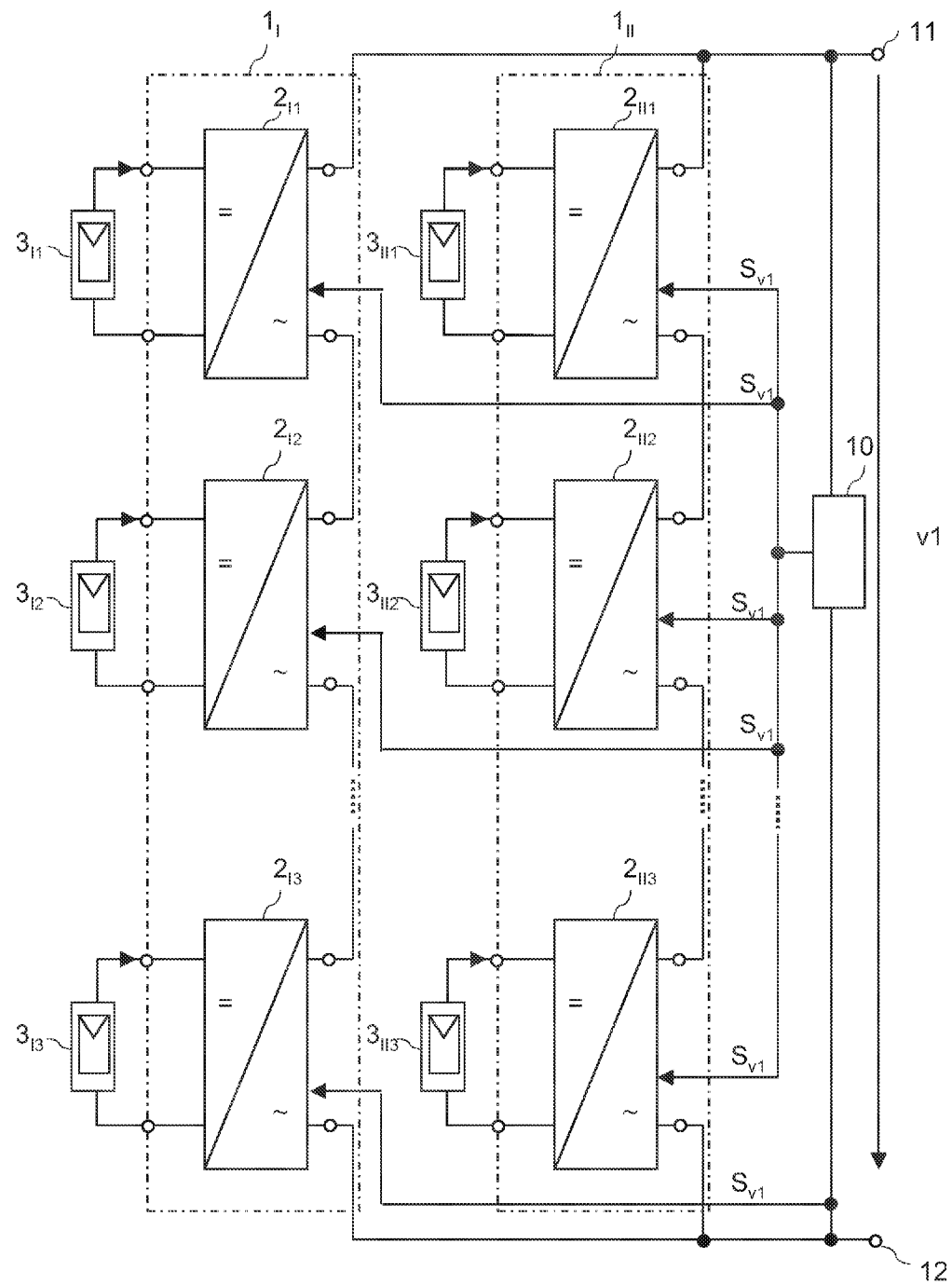
FIG. 23 illustrates an embodiment of a power converter circuit having a plurality of converter units organized in two series circuits being connected in parallel.

FIG. 23 illustrates a further embodiment of a power converter circuit. In this power converter circuit two series circuits $1_I$, $1_{II}$ each including one group with a plurality of converter units $2_{II}$-$2_{In}$ and $2_{III}$-$2_{IIn}$ connected in series are connected in parallel between the output terminals 11, 12. Each of the series circuits $1_I$, $1_{II}$ can be implemented in accordance with the series circuit 1 of converter units $2_1$-$2_n$ explained before. The converter units of the two groups (the two series circuits) are coupled to the same synchronization circuit 10 that can be implemented in accordance with one of the embodiments explained before. Of course, more than two series circuits each with a plurality of converter units can be connected in parallel.

Figure 24:
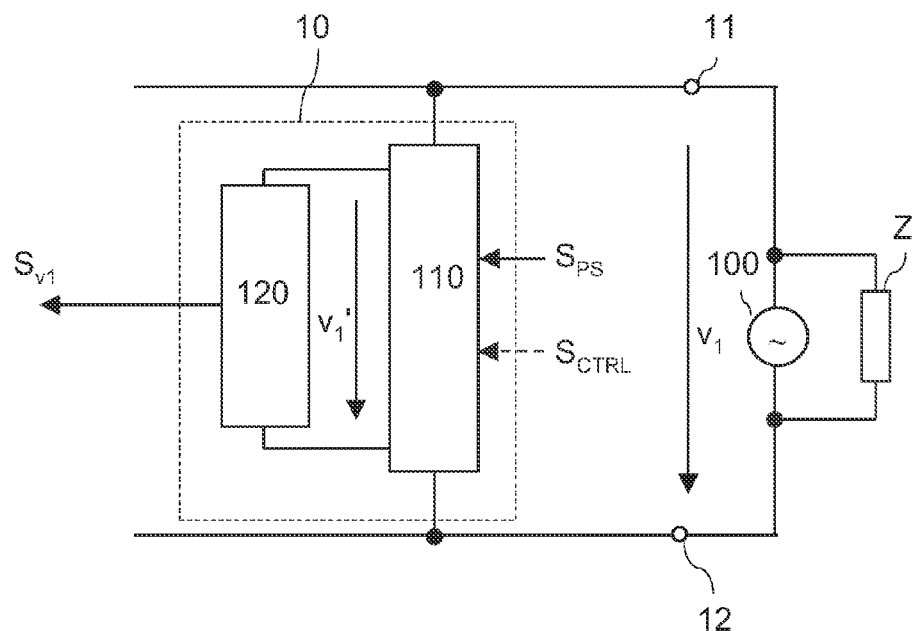
FIG. 24 illustrates a further embodiment of the synchronization circuit.

Referring to the explanation herein before, the synchronization circuit 10 can be implemented as a voltage measurement circuit that measures the external AC voltage v1 and that generates the at least one synchronization signal $S_{v1}$ such that the synchronization signal is a continuous signal representing the external AC voltage v1 and, therefore, having the same frequency and phase as the external AC voltage v1. FIG. 24 illustrates a further embodiment of the synchronization circuit 10.

In the embodiment illustrated in FIG. 24, the synchronization circuit 10 receives the external AC voltage $v_1$ available at the output terminals 11, 12 and generates the synchronization signal $S_{v1}$ as a continuous signal with a frequency and a phase that is dependent on the frequency and the phase of the external AC voltage $v_1$, respectively. According to one embodiment, the synchronization circuit 10 receives a phase-shift signal SPS that defines a desired phase shift between the synchronization signal $S_{v1}$ and the external AC voltage $v_1$. In the embodiment illustrated in FIG. 24, the synchronization circuit 10 includes a phase-shift circuit 110 that provides an output voltage $v_1'$. The output voltage $v_1'$ of the phase-shift circuit 110 has a phase shift relative to the external AC voltage $v_1$, with the phase shift being defined by the phase-shift signal $S_{PS}$. A transmission circuit 120 receives the output voltage $v_1'$ of the phase-shift circuit 110 and generates the at least one synchronization signal $S_{v1}$ transmitted to the individual converter units 2 (not illustrated in FIG. 24).

Figure 25:
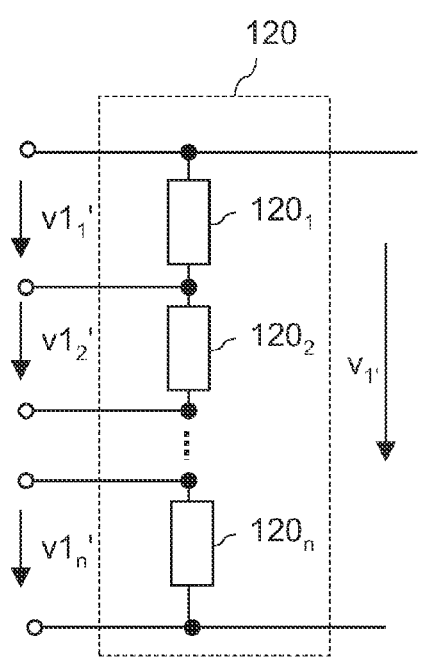
FIG. 25 illustrates an embodiment of a transmission circuit in the synchronization circuit of FIG. 24.

Referring to FIG. 25, the transmission circuit 120 may be implemented as a voltage divider having a plurality of voltage divider elements $120_1$, $120_2$, $120_n$ connected in series. The voltage divider of the transmission circuit 120 is similar to the voltage divider illustrated in FIG. 3. The individual voltage divider elements $120_1$-$120_n$ of the voltage divider 120 can be implemented like the voltage divider elements $10_i$ explained with reference to FIGS. 4A to 4C and 5. Referring to FIG. 25, each of the voltage divider elements $120_1$-$120_n$ provides a voltage $v1_{1'}$, $v1_{2'}$, $v1_{n'}$, with each of these voltages representing one synchronization signal received by one converter unit 2 (not illustrated in FIG. 25) in the same way as the individual converter units $2_1$-$2_n$ of FIG. 3 receive the individual voltages $v1_1$, $v1_2$, $v1_n$.

When employing a synchronization circuit 10 as illustrated in FIG. 24, a phase shift between the output currents i1 of the individual converter units 2 and the external AC voltage v1 can be adjusted through the phase-shift signal $S_{PS}$, so that there is no need to individually provide phase shift signals ($S_\phi$ in FIGS. 15, 21 and 22) to the individual converter units 2. However, it is of course possible to additionally provide phase shift signals to the individual converter units 2.

Transmitting the at least one synchronization signal $S_{v1}$ to the individual converter units through a voltage divider, as illustrated in FIG. 25, is only one possible embodiment. According to further embodiments, the at least one synchronization signal $S_{v1}$ is transmitted to the individual converter units 2 via a signal bus, a radio path, or via a power line using power line communication. Of course, corresponding receiver circuits are employed in the converter units 2 in this case.

Referring to power line communication, standard power line communication circuits can be used for the communication between the synchronization circuit 10 and the individual converter units 2 since the output current Because $i_{OUT}$ of the converter circuit is an AC current. In this case, the power line of the converter circuit 1, which is the line carrying the output current $i_{OUT}$ and connecting the outputs of the individual converter units 2 is used for the communication. A first power line communication interface (not shown) coupled to the power line receives the synchronization signal $S_{v1}$ and forwards the synchronization signal $S_{v1}$ suitably modulated via the power line to the individual converter units 2. Each converter unit includes a corresponding power line communication interface coupled to the power line and configured to receive and demodulate the modulated synchronization signal $S_{v1}$.

According to a further embodiment, that is illustrated in dashed lines in FIG. 24, the synchronization circuit does not only receive a phase-shift signal $S_{PS}$ but additionally to the phase shift signal $S_{PS}$ or instead of the phase shift signal $S_{PS}$ receives a control signal $S_{CTRL}$ through which other parameters of the synchronization signal $S_{V1}$, such as the frequency and/or the amplitude of the synchronization signal $S_{V1}$ can be adjusted. In this embodiment, the synchronization signal $S_{V1}$ can be generated independent of the external AC voltage $v_1$, which may be helpful in some operation scenarios explained below.

Referring to the explanation herein before, the synchronization signal $S_{v1}$ received by each converter unit 2 can be a continuous signal that is continuously transmitted from the synchronization circuit 10 to the converter units 2. Each of the converter units 2 continuously generates its corresponding output current i1 in accordance with the synchronization signal $S_{v1}$, which means with a frequency and a phase defined by the synchronization signal $S_{v1}$.

According to a further embodiment, the synchronization signal $S_{v1}$ is a pulse signal including a sequence of signal pulses and the individual converter 2 units are configured to generate a continuous signal having a frequency and a phase from the pulse signal.

Figure 26:
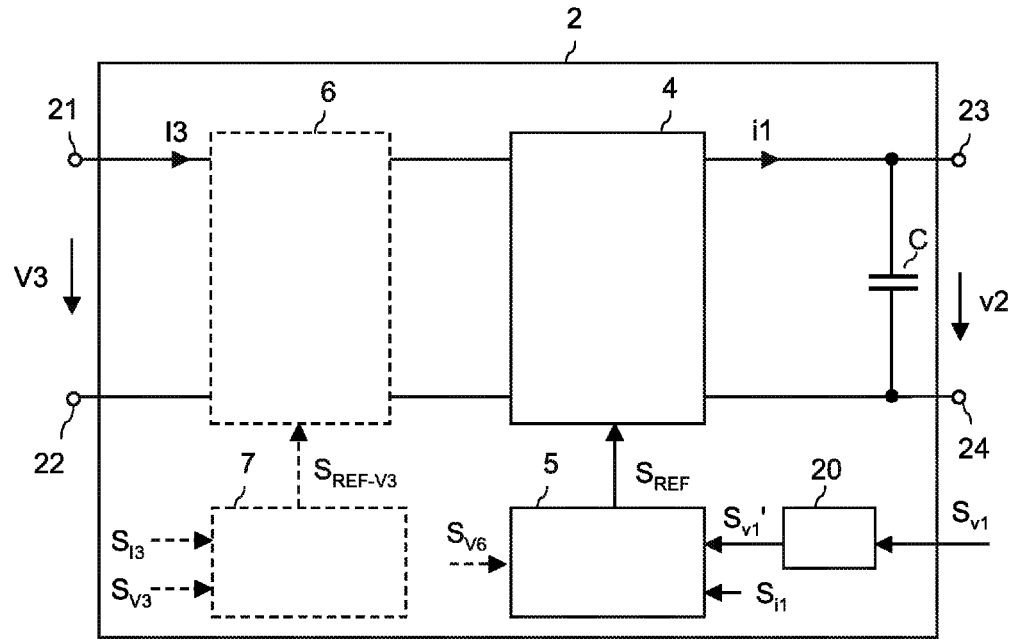
FIG. 26 illustrates a further embodiment of one converter unit.

FIG. 26 illustrates an embodiment of a converter unit 2 that is configured to receive a pulse signal as a synchronization signal $S_{v1}$. The converter unit of FIG. 26 corresponds to the converter units of FIGS. 5 and 11 and additionally includes a signal generator 20 that receives the pulsed synchronization signal $S_{v1}$ and that is configured to generate a continuous sinusoidal synchronization signal $S_{v1'}$ from the pulsed signal $S_{v1}$. In this embodiment, the continuous synchronization signal $S_{v1'}$ provided at the output of the signal generator 20 is received by the control circuit 5 and is processed in the control circuit 5 in the same way as a continuous sinusoidal synchronization signal $S_{v1}$ explained herein before.

Figure 27:
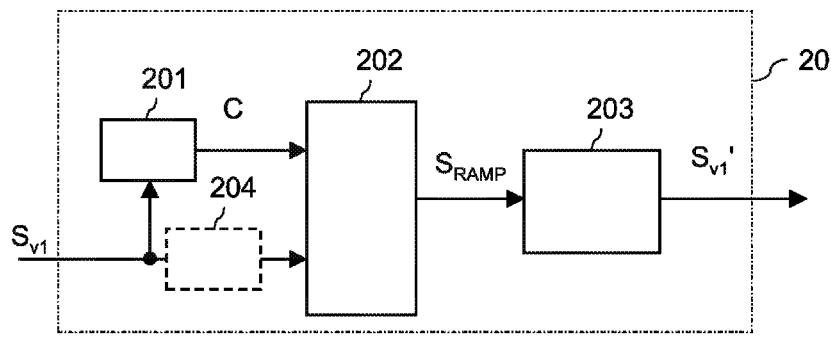
FIG. 27 illustrates a first embodiment of a signal generator in the converter unit of FIG. 26.
Figure 28:
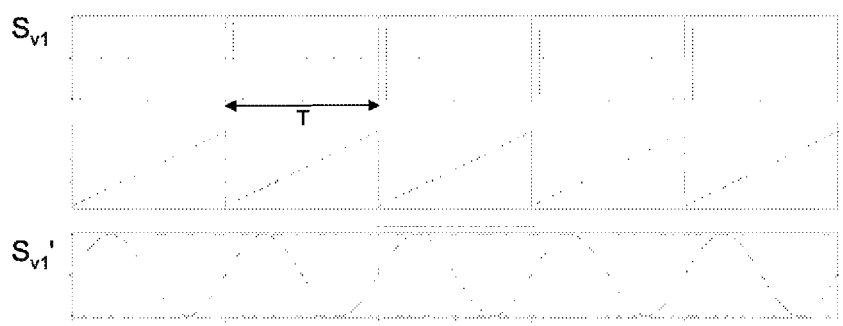
FIG. 28 illustrates timing diagrams of signals occurring in the signal generator of FIG. 27.

According to one embodiment, the pulsed synchronization signal $S_{v1}$ is a periodic signal having signal pulses that are equally distant, and signal generator 20 is configured to generate a sinusoidal signal $S_{v1'}$ from the pulsed signal $S_{v1}$. According to one embodiment, the signal generator 20 generates the sinusoidal synchronization signal $S_{v1'}$ such that a zero crossing of the sinusoidal signal $S_{v1'}$ occurs each time a signal pulse of the pulsed synchronization signal $S_{v1}$ occurs. In this embodiment, the mutual distance of the signal pulses defines the frequency of the continuous synchronization signal $S_{v1'}$ generated by the signal generator 20 and the absolute position of the individual signal pulses on the time scale defines the phase of the continuous synchronization signal. An embodiment of a signal generator 20 configured to receive a pulsed synchronization signal $S_{v1}$ and configured to generate a continuous sinusoidal synchronization signal $S_{v1'}$ with a frequency and a phase as defined by the pulsed synchronization signal $S_{v1}$ is illustrated in FIG. 27. Timing diagrams of signals occurring in this signal generator are illustrated in FIG. 28.

Referring to FIG. 27, the signal generator includes an integrator 202 receiving the pulsed synchronization signal $S_{v1}$ as a clock signal. A timing diagram of an embodiment of the pulsed synchronization signal $S_{v1}$ is illustrated in FIG. 28. The integrator is configured to integrate a constant signal C received at a second input beginning with each signal pulse of the pulsed synchronization signal $S_{v1}$. An output signal of the integrator 202 is a ramp signal $S_{RAMP}$ with a frequency corresponding to the frequency of the pulsed synchronization signal $S_{v1}$. The constant signal is provided by a calculation unit 201 that receives pulsed signal $S_{v1}$ and calculates the constant signal C to be proportional to the frequency of the pulsed synchronization signal $S_{v1}$, or to be inversely proportional to a time period T (see FIG. 28) of the pulsed signal $S_{v1}$. In the steady state, the slope of the individual ramps of the ramp signal $S_{RAMP}$ is dependent on the frequency (and decreases when the frequency is reduced) and the amplitudes of the individual ramps are equal. According to one embodiment, the calculation unit 201 calculates the constant value C in each cycle of the pulsed signal $S_{v1}$, and provides the calculated value to the integrator in the next cycle. Thus, a frequency change of the synchronization becomes effective in the generation of the ramp signal $S_{RAMP}$ with a delay of one cycle of the pulsed signal.

Referring to FIG. 27, a trigonometric function generator 203 receives the ramp signal $S_{RAMP}$ and generates the continuous synchronization signal $S_{v1'}$ by calculating the sine or the cosine of instantaneous values of the ramp signal $S_{RAMP}$. The resulting continuous synchronization signal $S_{v1'}$ is illustrated in FIG. 28. In the embodiment illustrated in FIGS. 27 and 28 the continuous synchronization signal $S_{v1'}$ has a zero crossing from negative to positive signal values each time a signal pulse of the pulsed synchronization signal occurs.

Of course, the signal generator of FIG. 27 could easily be modified to generate the continuous synchronization signal $S_{v1'}$ such that with each pulse of the pulsed signal $S_{v1}$ a zero crossing from positive to negative signal values occurs.

According to one embodiment, the pulsed synchronization signal $S_{v1}$ is only transmitted for a short time when a frequency and/or phase of the pulsed signal changes. This means, only a short sequence with some cycles of the pulsed signal $S_{v1}$ is transmitted, while after the transmission of the sequence the pulsed signal is interrupted for a time period significantly longer than one cycle period. This interruption may be several seconds or several minutes. In this embodiment, a clock generator receives the pulsed signal $S_{v1}$. The clock generator is configured to measure the frequency of the pulsed signal $S_{v1}$ and to generate a clock signal provided to the integrator with a frequency corresponding to the measured frequency of the pulsed signal $S_{v1}$. The clock generator is, in particular configured to store the frequency information and to generate the clock signal even in those time periods when the pulsed signal $S_{v1}$ has been switched off and updates the frequency each time a new sequence of the pulsed signal $S_{v1}$ is transmitted. Equivalently, the calculation unit stores the calculated value C until a new sequence of the pulsed signal $S_{v1}$ is transmitted that allows the calculation unit 201 to re-calculate the constant value.

According to a further embodiment, the synchronization signal $S_{v1}$ is an AC signal that is only transmitted for a certain time period, such as, for example, for a duration corresponding to only several periods of the AC signal. In this embodiment, the signal generator 20 is configured to evaluate a frequency and a phase information of the synchronization signal $S_{v1}$ and is configured to generate the continuous synchronization signal $S_{v1}$ based on this frequency and time information. In this embodiment, the synchronization signal $S_{v1}$ may be transmitted only once at the beginning of the operation of the power converter circuit 1 to the individual converter units, or may be transmitted periodically during the operation of the power converter circuit 1.

Figure 29:
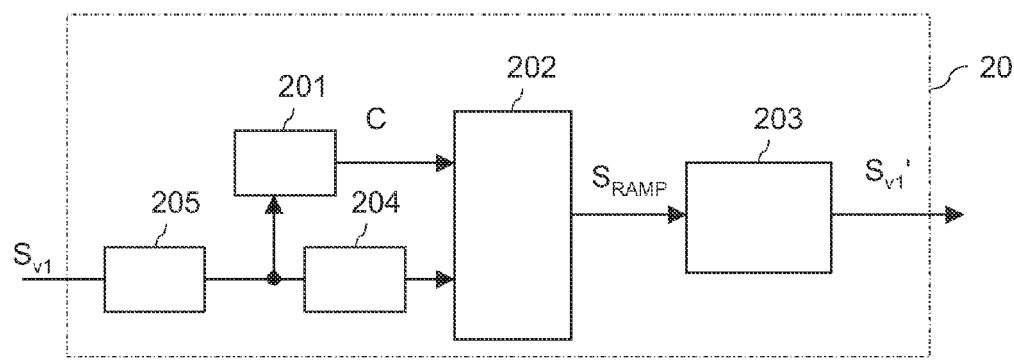
FIG. 29 illustrates a first embodiment of a signal generator in the converter unit of FIG. 26.

An embodiment of a signal generator 20 that is configured to generate a continuous (sinusoidal) synchronization signal $S_{v1'}$ from a synchronization signal $S_{v1}$ that is available for only several periods is illustrated in FIG. 29. The signal generator of FIG. 29 is based on the signal generator of FIG. 27 and additionally includes a zero crossing detector 205 receiving the synchronization signal $S_{v1}$ and configured to generate a pulse signal. The pulse signal generated by the zero crossing detector includes a signal pulse each time a positive or a negative zero crossing is detected. The pulse signal provided by the zero crossing detector 205 is then processed by the clock generator 204, the calculation unit 201, the integrator 202, and the trigonometric function generator 203 as explained with reference to FIGS. 27 and 28. In this embodiment, the continuous synchronization signal $S_{v1'}$ is synchronized to the synchronization signal $S_{v1'}$ during that time period when the synchronization signal $S_{v1}$ is available and, after the synchronization signal has been switched off, continues to generate the continuous synchronization signal $S_{v1'}$ based on the frequency and phase information stored in the clock generator 204 and the calculation unit 201.

According to a further embodiment, the synchronization signal $S_{v1}$ transmitted to the individual converter units corresponds to the frequency and phase signal $S_{\omega t}$ explained with reference to FIGS. 15, 21 and 22. In this embodiment, the signal generator 20 can be omitted and the control circuit 5 can be simplified by omitting the PLL 51.

In each of the individual cases where different signal waveforms of the synchronization signal $S_{v1}$ have been discussed, the synchronization signal $S_{v1}$ can be generated by the synchronization circuit 10 connected between output terminals 11, 12.

So far, the operation of the power converter circuit in a normal operation mode has been explained. In the normal operation mode, each of the individual converter units 2 is configured to generate its output current i1 such that the output current i1 has a frequency and the phase as defined by the synchronization signal Sv1 received by the converter unit 2. Besides the normal operation mode other operation modes of the power converter circuit 1 as well.

Figure 30:
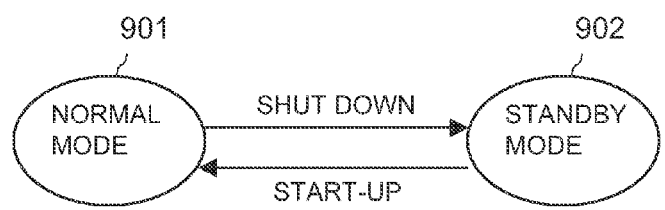
FIG. 30 schematically illustrates two possible operation modes of the power converter circuit.

According to one embodiment, that is schematically illustrated in FIG. 30, the power converter circuit 1 is either operated in the normal mode 901 or in a standby mode 902. In the standby mode 902 the individual converter units 2 are deactivated so that the output currents i1 of the individual converter units 2 are zero, but may again be activated.

For example, the power converter is, e.g. in the standby mode, when the supply voltages ($V3_1$-$V3_n$ in FIG. 1) provided by the DC power sources are too low for generating the output currents i1. When the individual DC power sources $3_1$-$3_n$ are implemented as PV modules, this may occur at night.

The power converter circuit 1 switches from the normal mode 901 to the standby mode 902 when a shut-down condition is met, and changes from the standby mode 902 to the normal mode when a start-up condition is met. The process of switching the power converter circuit 1 from the normal mode to the standby mode will be referred to as shut down and a sequence of operations involved in this process will be referred to as shut-down sequence in the following. The process of switching the power converter circuit 1 from the standby mode to the normal mode will be referred to as start-up and a sequence of operations involved in this process will be referred to as start-up sequence in the following.

Figure 31:
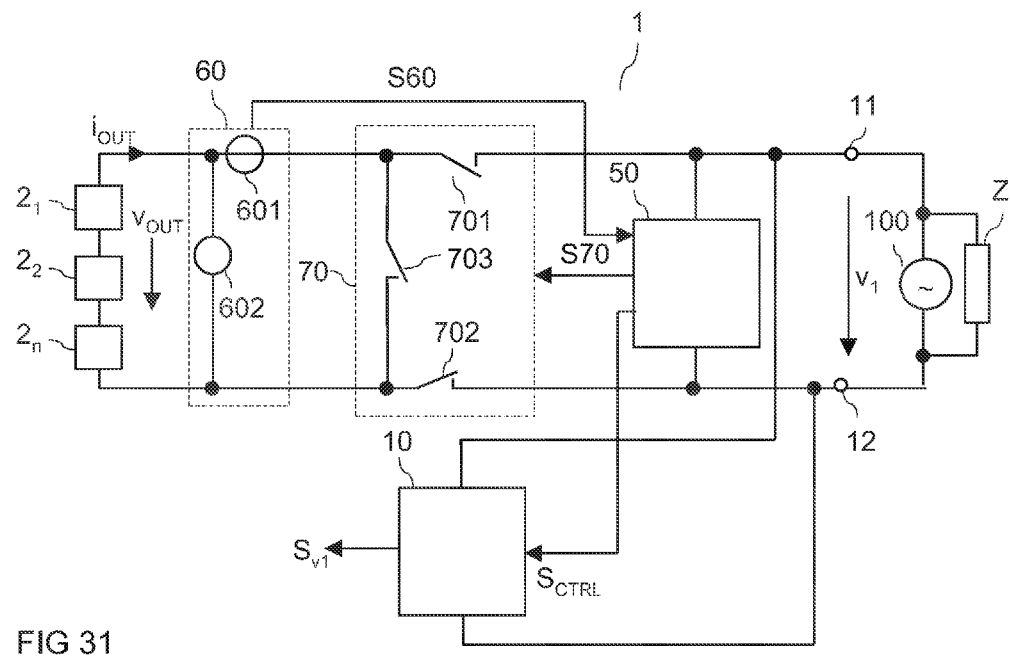
FIG. 31 illustrates an embodiment of a power converter circuit including an operation mode controller.

The power converter circuit 1 may include an operation mode controller that defines the operation mode of the power converter circuit 1. With other words, the operation mode controller 50 controls the overall operation of the power converter circuit 1. FIG. 31 illustrates a block diagram of a power converter circuit 1 that includes an operation mode controller 50. The operation mode controller 50 can be implemented as a microprocessor, an ASIC, a digital signal processor, a state machine, or the like.

In the embodiment illustrated in FIG. 31, the operation mode controller 50 receives at least one operation parameter of the power converter circuit 1 from a measurement unit 60, is configured to control a connection circuit 70 connected between the series circuit with the individual converter units $2_1$-$2_n$, and the output terminals 11, 12, and is configured to control the synchronization unit 10. The measurement circuit 60 is configured to measure at least one of the output current $i_{OUT}$ of the series circuit with the converter units $2_1$-$2_n$, and a voltage $v_{OUT}$ across the series circuit $2_1$-$2_n$. As schematically illustrated in FIG. 31, the measurement circuit 60 may include a current measurement circuit 60 for measuring the output current $i_{OUT}$, and a voltage measurement circuit 602 for measuring the output voltage $v_{OUT}$. The output voltage $v_{OUT}$ across the series circuit corresponds to the external AC voltage $v_1$ when the series circuit is connected to the output terminals 11, 12. The connection circuit 70 that is configured to either connect the series circuit $2_1$-$2_n$ to the output terminals 11, 12 or to disconnect the series circuit $2_1$-$2_n$ from the output terminals 11, 12 may include two switches, namely a first switch 701 connected between the series circuit $2_1$-$2_n$ and the first output terminal 11 and a second switch 702 connected between the series circuit $2_1$-$2_n$ and the second output terminal 12. These switches 701, 702 can be implemented as conventional switches, such as relays or semiconductor switches (MOSFETs, IGBTs, etc.). Referring to FIG. 31, the connection circuit 70 may include an optional third switch 703 connected in parallel with the series circuit $2_1$-$2_n$. This switch 703 may be closed when an output voltage of the series circuit with the individual converter units 2 is above a given voltage threshold, in order to limit the output voltage. Optionally, a resistor or another type of current limiting element is connected in series with this switch 703.

In FIG. 31, signal S60 provided by the measurement circuit 60 to the operation mode controller 50 represents the at least one operation parameter measured by the measurement circuit 60. This measurement signal S60 includes information on at least one of the output current $i_{OUT}$ and the output voltage $v_{OUT}$. Signal S70 in FIG. 31 schematically illustrates a control signal generated by the operation mode controller 50 and received by the connection circuit 70.

Dependent on the control signal S70, the connection circuit 70 connects the series circuit to the output terminals 11, 12, disconnect the series circuit from the output terminals 11, 12, or short-circuits the series circuit $2_1$-$2_n$.

Referring to FIG. 31, the operation mode controller 50 further controls the synchronization circuit 10 that generates the synchronization signal $S_{v1}$. In FIG. 31, only the control signal $S_{CTRL}$ is drawn to be received by the synchronization circuit 10. The control signal $S_{CTRL}$ defines the signal parameters of the synchronization signal $S_{v1}$, such as frequency, phase and amplitude. As controlled by the control signal $S_{CTRL}$ the synchronization signal $S_{v1}$ can dependent on the external AC voltage $v_1$ also received by the synchronization circuit 10, such as have a given phase shift (zero or other than zero) relative to the external AC voltage, or the synchronization signal $S_{v1}$ can be independent of the external AC voltage $v_1$. Referring to the explanation below, there may be operating scenarios (such as fault ride through) where it is necessary to generate the synchronization signal $S_{v1}$ independent of the external AC voltage $v_1$.

In the power converter circuit of FIG. 31, the synchronization signal $S_{v1}$ is not only used in the normal mode to provide a synchronization information to the individual converter units 2 for generating the output currents i1, but is also used in the standby mode for signalling the individual converter units 2 that a change from the standby mode to the normal mode is desired. In this power converter circuit 1, the operation mode controller 50 has the synchronization circuit 10 generate the synchronization signal $S_{v1}$ with a standby waveform in the standby mode. The standby waveform is a waveform that is different from the signal waveform of the synchronization signal $S_{v1}$ in the normal mode. According to one embodiment, the standby waveform is a waveform with a constant signal value, such as zero.

Figure 32:
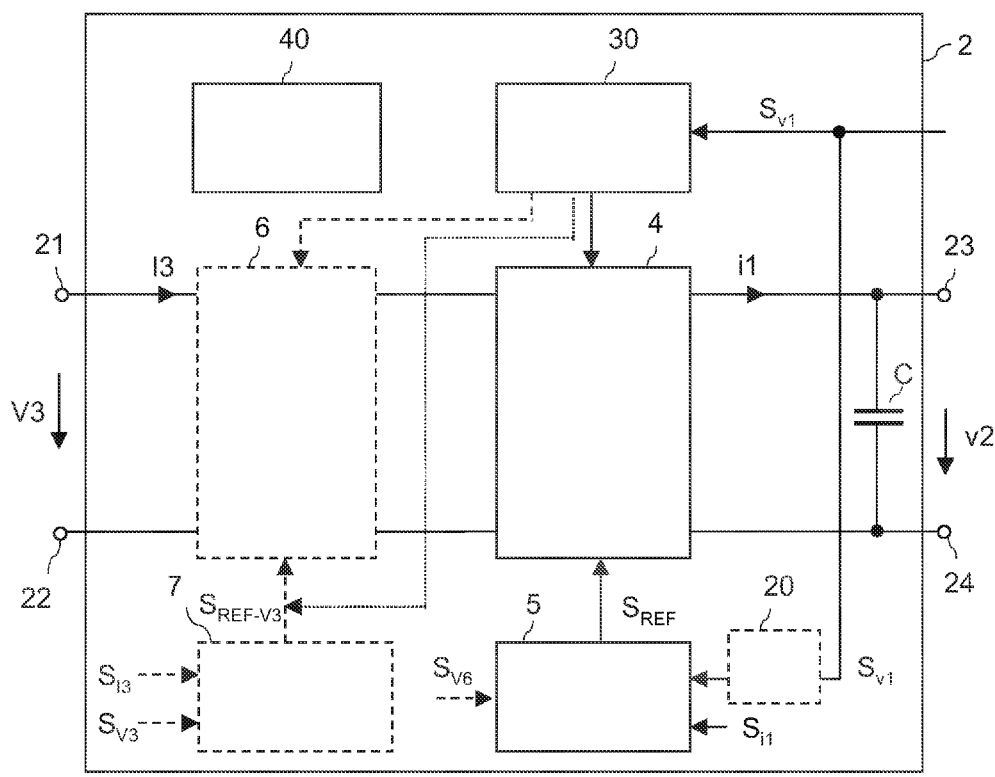
FIG. 32 illustrates an embodiment of a converter unit including an operation mode unit.

FIG. 32 illustrates an embodiment of a converter unit 2 that is configured to evaluate the operation mode information included in the synchronization signal $S_{v1}$ and that can be operated in a normal mode or a standby mode. The overall power converter circuit 1 is in the normal mode when each of the converter units 2 is in the normal mode and is in the standby mode when each of the converter units is in the standby mode 2. The converter unit 2 shown in FIG. 32 is based on the converter units of FIGS. 5, 11 and 26, where the DC/DC converter 6 and its control circuit 7, and the signal generator 20 are optional. The converter unit 2 includes an operation mode unit 30 that receives the synchronization signal $S_{v1}$ and that is configured to evaluate the synchronization signal $S_{v1}$. The operation mode unit 30 is, in particular, configured to detect a change of the synchronization signal $S_{v1}$ from the standby waveform to the normal waveform, the latter being the usual waveform in the normal mode. Referring to the explanation above, the normal waveform can be a continuous AC waveform, a pulsed signal waveform, or an AC waveform with only periods.

The operation mode unit 30 is further configured to control the DC/AC converter 4, in particular to activate the DC/AC converter 4 in the normal mode and to deactivate the DC/AC converter in the standby mode. When the converter unit 2 further includes the DC/DC converter 6, the operation mode unit 30 further controls the operation (activates or deactivates) of the DC/DC converter 6. When the DC/AC converter 4 and the optional DC/DC converter 6 is activated, the operating principle of the converter unit 2 corresponds to the operating principle explained before, which means the converter unit 2 provides an output current i1 in accordance with the synchronizations signal $S_{v1}$. When the DC/AC converter 4 and the optional DC/DC converter 6 are deactivated, the switches (see FIGS. 6 and 19) in the DC/AC converter 4 and the DC/DC converter are either switched off, or some of the switches are permanently switched on. This is explained in greater detail below.

In the standby mode, the operation mode controller 50 either disconnects the series circuit $2_1$-$2_n$ from the output terminals 11, 12 and, therefore, from the external AC voltage $v_1$, or leaves the series circuit $2_1$-$2_n$ connected to the output terminals 11, 12.

Embodiments of start-up sequences for switching from the standby mode to the normal mode are explained below. For explanation purposes it is assumed that the individual DC power sources are PV modules. In this case, a start-up sequences is required at least once a day, namely in the morning after sunrise.

Figure 33:
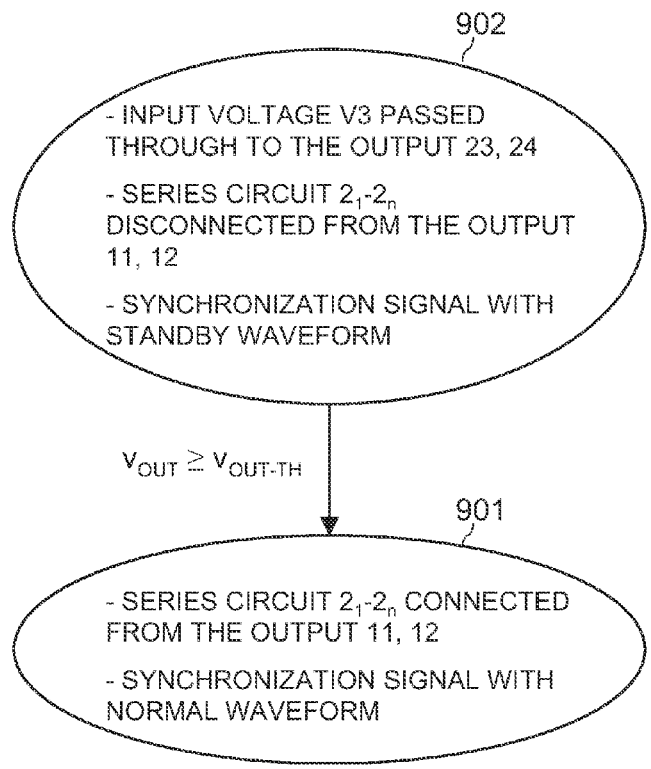
FIG. 33 illustrates a first embodiment of a transfer from a first operation mode to a second operation mode.

A first embodiment of a start-up sequence (start-up sequence A) is illustrated in FIG. 33. In this embodiment, the individual converter units 2 in the standby mode 902 are configured to pass the input voltage V3 from the input terminals 21, 22 through to the output terminals 23, 24, and the operation mode controller 50 is configured to have the connection circuit 70 disconnect the series circuit $2_1$-$2_n$ from the output terminals 11, 12.

The input voltage V3 can be connected through the converter unit 2 to the output terminals 23, 24 by switching on switches in the DC/AC converter 4 and the optional DC/DC converter 6 in a specific configuration. When, for example, the DC/AC converter 4 is implemented with a H4-bridge as illustrated in FIG. 6, the input voltage V3 can be connected through to the output terminals 23, 24 by permanently switching on the first switch 421 and the fourth switch 424. When the optional DC/DC converter 6 is a boost converter, as illustrated in FIG. 12, the switch 65 is permanently switched off, and when the optional DC/DC converter 6 is a buck converter, as illustrated in FIG. 14, the switch 65 is permanently switched on. The switching states of the switches in the DC/AC converter 4 and the DC/DC converter 6 in the standby mode is governed by the operation mode unit 30.

When, for example, the DC/AC converter is implemented with a buck converter and an unfolding bridge as illustrated in FIG. 19, the input voltage V3 can be connected through to the output terminals 23, 24 by permanently switching on the first switch $85_1$ and the fourth switch $85_4$ in the unfolding bridge 85 and by switching on the switch 83 in the buck converter 80.

After sunrise, the input voltage V3 at the input terminals 21, 22 and, therefore, the output voltage v2, which at this stage is a DC voltage, increases. The operation mode controller 50 is configured to detect the output voltage $v_{OUT}$. The output voltage $v_{OUT}$ is the sum of the output voltages v2 of the individual converter units 2, where this output voltage $v_{OUT}$ increases after sunrise when the solar power received by the PV modules increases. When the output voltage $v_{OUT}$ reaches a given threshold voltage $v_{OUT-TH}$, the operation mode controller 50 controls the synchronization circuit 10 to generate the synchronization signal $S_{v1}$ with the normal waveform has the connection circuit 70 connect the series circuit $2_1$-$2_n$ to the output terminals 11, 12. Referring to the explanation before, the synchronization signal $S_{v1}$ in a normal mode can be a continuous AC signal, a periodic pulse signal, or an AC signal for a limited time duration.

The operation mode unit 30 detects the change of the synchronization signal $S_{v1}$ from the standby level to the normal level. The operation mode unit 30 then activates the DC/AC converter 4 and the optional DC/DC converter 6 to operate as explained with reference to FIGS. 1 to 23 before.

According to one embodiment, the DC/AC converter 4 and the optional DC/DC converter 6 are activated at the time of a zero crossing of the synchronization signal $S_{v1}$, so as to ramp up the output current i1.

According to one embodiment, not only frequency and phase of the output current i1, but also the amplitude of the output current i1 is controlled during the start-up phase so as to, e.g., continuously increase the output current in the start-up phase. The output current i1 of each converter 2 can be controlled by controlling the input power of the converter 2. Controlling the input power is possible in each converter topology in which the input voltage V3 is controlled, that is in each topology where the input voltage V3 is adjusted dependent on an input voltage reference signal $S_{V3\text{-}REF}$. In the normal mode, the input voltage reference signal $S_{V3\text{-}REF}$ may be generated by an MPP tracker (see, circuit block 7 in FIGS. 11 and 32) that serves to operate PV modules 3 providing the input voltage V3 in an optimum operation point. In order to control the input voltage V3 and, therefore, in order to control the output current i1 during start-up, the operation mode control circuit 30 can be configured to provide the input voltage reference signal $S_{REF\text{-}V3}$ during start-up or can be configured to control the MPP tracker 7 during start-up. This is schematically illustrated in dotted lines in FIG. 32. During the start-up phase, the PV modules 3 are not necessarily operated in their MPP. According to one embodiment, the operation mode control circuit 30 increases the input voltage reference signal $S_{REF\text{-}V3}$ stepwise in two, three or more steps, so as to stepwise increase the amplitude of the AC output current i1 of the individual converter units 2.

When in the converter unit 2 of FIG. 32, the DC/AC converter 4 includes a buck converter 80 and an H4-bridge 85, as illustrated in FIG. 19, the buck converter 80 can be configured to control the input voltage V3. The DC/DC converter 6 may be omitted in this case. An embodiment of a control circuit 5 that is configured to control the input voltage V3 in the DC/AC converter 4 of FIG. 19 is illustrated in FIG. 22. While in the normal mode, the input voltage reference signal $S_{V3\text{-}REF}$ is provided by an MPP tracker (not illustrated in FIGS. 19 and 22), the input voltage reference signal $S_{V3\text{-}REF}$ may be provided by the operation mode unit 30 during the start-up phase in order to control the output current i1 during the start-up phase.

Switching on the switches in the DC/AC converter 4 and the optional DC/DC converter 6 in the standby mode requires a power supply. Referring to FIG. 32, each converter unit 2 includes a power supply unit 40 that provides for the power supply of the individual components in the converter unit 2. The power supply unit 40 is either connected to the input terminals 21, 22, to the output terminals 23, 24 or, when there is a DC link capacitor between the DC/DC converter 6 and the DC/AC converter 4, to the DC link capacitor.

When the power supply unit 40 is connected to the input terminals 21, 22, energy for switching on the switches in the DC/AC converter 4 and the DC/DC converter 6 is, of course, only provided when an input voltage V3 other than zero is provided by the DC power source. Thus, after sunrise, the input voltage V3 first powers the power supply unit 40, which powers the components in the power converter unit 2, which then passes the input voltage V3 through to the output terminals 23, 24, the output voltage v2 is then detected by the operation mode controller 50, which then has the converter unit 2 change to the normal mode by having the synchronization circuit 10 change the synchronization signal $S_{v1}$ from the standby waveform to the normal waveform.

Before solar power is provided to the PV modules, i.e. when the input voltage V3 is zero, each of the switches in the converter unit 2 is switched off and the converter unit cannot be activated. This operation mode can be referred to as shut-off mode.

Start-Up Sequence B

Figure 34:
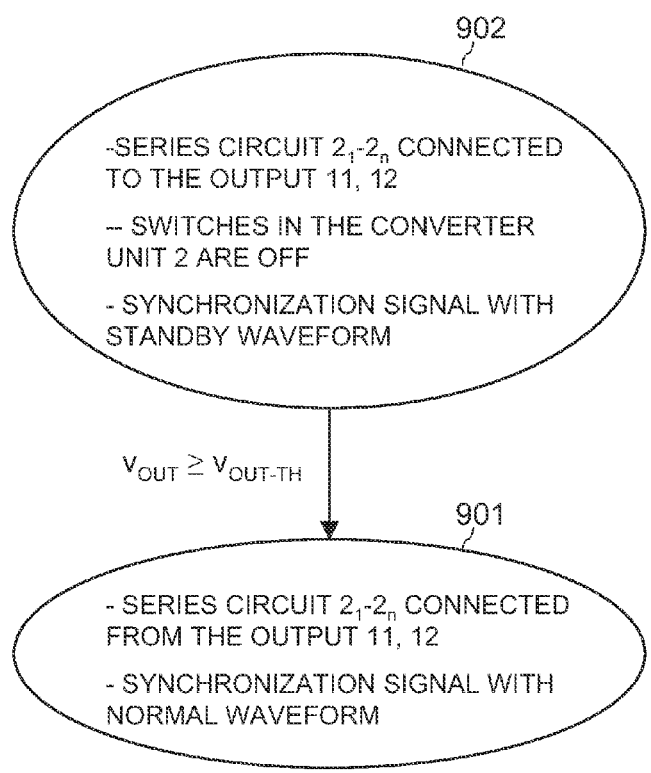
FIG. 34 illustrates a second embodiment of a transfer from a first operation mode to a second operation mode.

A second embodiment of a start-up sequence (start-up sequence B) is illustrated in FIG. 34. In this embodiment, the operation mode controller 50 leaves the series circuit $2_1$-$2_n$ connected to the output terminals 11, 12 when the power converter circuit 1 is in the standby mode. The individual converter units 2 are deactivated, so that the output current $i_{OUT}$ is zero and the output voltage $v_{OUT}$ corresponds to the external AC voltage $v_1$. The external AC voltage $v_1$ charges the input capacitor of the DC/AC converter 4, which is the DC link capacitor when a DC/DC converter 6 and a DC/AC converter 4 are employed. The charging of the input capacitor of the DC/AC converter 4 is explained for the DC/AC converter topologies of FIGS. 6 and 19 below. Referring to FIG. 6, the switches of the H4-bridge each have a freewheeling element $42_1$-$42_4$. Via these freewheeling elements the input capacitor 41 (or the DC link capacitor 60 of FIG. 11) is charged to the peak value of the AC voltage v2 between the output terminals 23, 24, when the switches $42_1$-$42_4$ are switched off. Thus, in the standby mode, the operation mode unit (30 in FIG. 32) controls the switches of a DC/AC converter 4 implemented with a H4-bridge to be switched off.

When the DC/AC converter 4 is implemented with an unfolding bridge 85 as illustrated in FIG. 19, the DC link capacitor 89 is charged through freewheeling elements (not illustrated in FIG. 19) of the individual switched $85_1$-$85_4$ to the peak value of the AC input voltage v2.

In this embodiment, the power supply unit 40 is connected to the input capacitor of the DC/AC converter 4 or to the DC link capacitor which permanently provides for a power supply of the converter unit 2.

While in the start-up sequence A the power converter automatically enters the normal mode when sufficiently high input voltages V3 are provided, an additional trigger signal is required in the start-up sequence B informing the operation mode controller 50 that the power converter circuit 1 may switch from the standby mode to the normal operation mode. According to one embodiment, the trigger signal is a signal indicating the sunrise and, therefore the time when enough solar power is expected to be received by the individual PV modules in order to successfully switch from the standby mode to the normal mode. This trigger signal can be provided from an external source to the operation mode controller 50 or can be calculated in the operation mode controller 50 dependent on the specific date, the geographical position of the PV modules and a table that includes the time of sunrise at the geographical position at different dates. This signal triggering a switching from the standby mode to the normal mode will be referred to as trigger signal or sunrise signal in the following.

Start-Up Sequence C

According to a further embodiment (start-up sequence C), which includes features from both, the start-up sequences A and B, the operation mode controller 50 leaves the series circuit $2_1$-$2_n$ disconnected from the output terminals 11, 12 in the standby mode. Further, the converter units 2 are configured to pass through the input voltage V3 to the output terminals 23, 24 in the standby mode. In this embodiment, switching of the power converter circuit 1 from the standby mode to the normal mode is initiated by the sunrise signal. Again, switching from the standby mode to the normal mode includes changing the waveform of the synchronization signal $S_{v1}$ from the standby waveform to the normal waveform.

There may be several reasons for the power converter circuit 1 to switch from the normal mode to the standby mode. According to one embodiment, the operation mode controller 50 is also configured to cause the power converter circuit 1 to switch from the normal mode to the standby mode when the operation mode controller 50 detects the occurrence of a shut-down condition. A shut-down information can be transmitted from the operation mode controller 50 to the individual converter units 2 in different ways. When a shut down information is received by the individual converter units 2, the converter units are deactivated and enter the standby mode.

As explained above in connection with start-up sequence I, the operation mode controller 50 can be configured to only start-up the power converter circuit 1 when the output voltage vOUT in the standby mode is higher than a given reference voltage. When the output voltage vOUT is too low, this may have several reasons: First, the solar power received by the PV modules can be too low. Second, there are not enough converter units 2 connected in series.

Transmission of Shut-Down Information I

According to a first embodiment, the synchronization signal $S_{v1}$ is used to transmit a shut-down information from the operation mode controller 50 to the individual converter units 2. Independent of the waveform of the synchronization signal $S_{v1}$ in the normal mode, the operation mode controller 50 simply controls the synchronization circuit 10 to generate a standby waveform of the synchronization signal $S_{v1}$. The operation mode units 30 in the individual converter 2 are configured to detect the standby waveform and to deactivate the corresponding converter unit upon detection of the standby waveform. In the standby mode, the output currents i1 of the individual converter units 2 become zero.

Transmission of Shut-Down Information II

According to a further embodiment, the operation mode controller 50 has the connection circuit 70 to disconnect the series circuit from the output terminals 11, 12 when a switching from the normal mode to the shut-off mode is desired. When the series circuit $2_1$-$2_n$ is disconnected from the power grid and when the converter units 2 are still in the normal mode, the output current provided by each converter unit 2 causes the output voltages v2 of the individual converter units 2 to increase, so that the overall output voltage $v_{OUT}$ increases. In this embodiment, the converter units 2, are configured to detect their output voltage v2 and are configured to enter the standby mode when the output voltage increases to an overvoltage threshold. According to one embodiment, the operation mode unit 30 of each converter unit 2 monitors the output voltage v2 and compares the output voltage with the overvoltage threshold and shuts down the converter unit 2 when the output voltage v2 reaches the overvoltage threshold. According to one embodiment, the overvoltage threshold is chosen to be dependent on the voltage blocking capability of the semiconductor switches employed in the DC/AC converter 4 of each converter unit 2.

In this embodiment, there is no direct transmission of information from the operation mode controller 50 to the individual converter units 2. Instead, the switching information is provided by allowing the output voltages v2 of the individual converter units 2 to increase to the overvoltage threshold.

Also in those cases in which the synchronization signal is used to transmit the switching information, so that there is no intended overvoltage in the individual converter units 2, an overvoltage of the output voltages of one converter unit 2 may occur, e.g., when disconnecting the series circuit $2_1$-$2_n$ from the power grid. Thus, an overvoltage protection may be implemented in the individual converter units 2 in each case, Some embodiments of shut-down conditions (errors) that can be detected by the operation mode controller are explained below. Dependent on the type of error, the operation mode controller 50 may try to restart the power converter circuit 1 after a certain time, or may keep the power converter circuit shut down.

Low Output Current

According to one embodiment, the power converter circuit switches from the normal mode to the standby mode, when the output current falls below a given current threshold. This transfer is initiated by the operation mode controller 50 that compares the output current iOUT based on information received from the measurement unit 60 with the current threshold. The current threshold is, for example, chosen from a range of between 0.2 A and 0.5 A.

Undervoltage Condition

Another type of error may occur when the solar power received by each of the converter units 2 is low. In this case, the output current $i_{OUT}$ of the series circuit with the individual converter units 2 may have a non-sinusoidal waveform such that the waveform of the output current $i_{OUT}$ follows the waveform of the external AC voltage $v_1$ when the instantaneous value of the output voltage v1 is low, and that the output current $i_{OUT}$ is kept on a constant value or even decreases at higher instantaneous values of the output current. This type of error can be detected by the operation mode controller 50 by comparing the waveform of the output voltage $v_{OUT}$ or the external AC voltage $v_1$, respectively, and the output current $i_{OUT}$. When this type of error is detected by the operation mode controller 50, the operation mode controller 50 initiates one of the shut-down sequences explained above in order to switch the power converter circuit 1 into the standby mode.

Phase Difference

According to a further embodiment, the operation mode controller 50 is configured to measure a phase difference between a phase of the external AC voltage $v_1$ and the output current $i_{OUT}$. When this phase difference is larger than a desired phase difference, namely the phase difference given by the synchronization signal $S_{v1}$ $v_1$ and/or the phase difference as defined by the phase signals $S_\varphi$, two different courses of action initiated by the operation mode controller 50 are possible. When, for example, the phase difference between the output voltage $i_{OUT}$ and the external AC voltage $v_1$ is below a first phase difference threshold, the phase difference of the synchronization signal $S_{v1}$ relative to the external AC voltage $v_1$ can be changed in order to readjust the phase difference between the output current $i_{OUT}$ and the external AC voltage $v_1$. When, however, the phase difference is above the phase-difference threshold, the operation mode controller 50 may shut down the power converter circuit 1 using one of the shut-down sequences explained before.

Sunset

Similar to having the power converter start-up using a trigger signal at sunrise, a corresponding trigger signal can be used to shut-down the power converter circuit at sunset.

Automatic Shut Down

When, for example, the solar power received by some of the PV modules is much lower than the solar power received by other modules, the output voltage of the converter units 2 connected to the PV modules receiving a low solar power decreases, while the output voltage of the other converter units 2 increases. This mechanism has been explained in detail herein before. When there are several PV modules that receive a significantly lower solar power than other modules, the external AC voltage $v_1$ applied to the output terminals 11, 12 may result in an overvoltage at the outputs of the other converter units 2. The converter units 2 having an overvoltage may shut down, which results in an overvoltage at the outputs of other converter units 2, which are then shut down. This proceeds, until each of the converter units 2 is shut down. When the converter units 2 are shut down, the output current becomes zero. In this case, the individual converter units 2 automatically shut down, so that no shut-down information has to be transmitted from the operation mode controller 50 to the individual converter units 2. A decrease of the output current to zero is detected by the operation mode controller 50 which may then cause the synchronization circuit 10 to generate a standby waveform of the synchronization signal $S_{v1}$.

The operation mode controller 50 may not only be configured to monitor the operation of the power converter circuit 1, but may also be configured to monitor the power grid, specifically the external AC voltage $v_1$, in order to shut down the power converter circuit 1 when an error is detected.

Anti-Islanding

A first type of grid error that may occur is "islanding". In this case, the power grid has a high input impedance at the input terminals 7, 12. This error can be detected by having the series circuit with the converter units 2 generate a constant output current $i_{OUT}$ or an AC output current $i_{OUT}$ with a frequency that is different from the frequency of the external AC voltage $v_1$. As explained hereinbefore, the frequency of the output current $i_{OUT}$ (which is zero, when the output current $i_{OUT}$ is constant) can be adjusted through the synchronization signal $S_{v1}$.

In order to test for the occurrence of an islanding error, the operation mode controller 50 can be configured to have the synchronization circuit 10 generate the synchronization signal with a frequency other than the frequency of the external AC voltage $v_1$. In a test mode in which the operation mode controller 50 changes the output current $i_{OUT}$ as explained before, the operation mode controller 50 compares the waveform of the output current $i_{OUT}$ with the waveform of the external voltage $v_1$ available at the output terminals 11, 12. When the waveform of the external voltage $v_1$ follows the waveform of the output current $i_{OUT}$, the power grid has a high input impedance (or has even been switched off distant to the output terminals 11, 12). In this case, the operation mode controller shuts down the power converter circuit 1.

Interruption of Grid Voltage

According to one embodiment, the operation mode controller 50 is configured to monitor the external AC voltage $v_1$ and is configured to shut down the power converter circuit 1 when the external AC voltage $v_1$ is switched off or interrupted.

Fault Ride Through

According to one embodiment, the operation mode controller 50 does not shut down the power converter circuit 1 immediately when the external AC voltage $v_1$ is interrupted, but has the series circuit generate an AC output current $i_{OUT}$ for a specified time period, such as, for example, several milliseconds (ms). The operation mode controller 1 shuts down the power converter circuit 1 when the external AC voltage $v_1$ has not recovered after this specified time period. The operation mode in which an AC output current $i_{OUT}$ is provided although the external AC voltage $v_1$ has been interrupted, is out phase, lower than usual, distorted, short-circuited, etc., is referred to as "fault ride through".

In the fault-ride-through mode, the synchronization information in accordance to which the individual converter units 2 generate their output currents i1 can be provided in different ways. An embodiment, in which the synchronization information is only transmitted at the beginning of the normal mode and in which a continuous synchronization signal is generated (in the signal generator 20) in the individual converter units 2, no additional synchronization information needs to be provided in the fault-ride-through mode. When, however, the individual converter units 2 require a continuous synchronization signal, and when the synchronization signal in the normal mode is generated from the external AC voltage $v_1$, the synchronization circuit 10 in the fault-ride-through mode continuous to generate a continuous synchronization signal based on the frequency and phase information of the synchronization signal generated before in the normal mode, i.e. before an interruption of the external AC voltage $v_1$ has been detected.

Reactive Power Generation

The power converter circuit 1 may even be used to stabilize the voltage on the power grid.

Referring to the explanation provided before, in the normal mode, the output current $i_{OUT}$ generated by the series circuit of the individual converter units 2 has a frequency and a phase as defined by the synchronization signal $S_{v1}$. The frequency and the phase of the synchronization signal $S_{v1}$ can be adjusted by the operation mode controller 50. In the normal mode, the synchronization signal $S_{v1}$ is usually generated such that the frequency information included in the synchronization signal $S_{v1}$ corresponds to the frequency of the external AC voltage $v_1$ and the phase information corresponds to the phase of the external AC voltage $v_1$. In this case, the output current $i_{OUT}$ is in phase with the external AC voltage $v_1$.

However, there may be situations in which it is desired to have a phase difference between the output current $i_{OUT}$ and the external AC voltage $v_1$, in order to provide reactive power to the power grid so as to stabilize the voltage on the power grid. This phase difference can easily be adjusted by suitably adjusting the phase information included in the synchronization signal $S_{v1}$. According to one embodiment, the operation mode controller 50 receives an external signal from a utility provider, where this external signal includes a desired phase difference between the output current $i_{OUT}$ and the external voltage $v_1$. The external signal can be provided to the operation mode controller via conventional communication channels, such as radio channels, power lines, or the internet.

According to a further embodiment, the operation mode controller 50 measures the output power provided by the power converter circuit 1 to the power grid and adjusts the phase difference between the output current $i_{OUT}$ and the external AC voltage $v_1$ dependent on the output power. According to one embodiment, the phase difference increases, so as to increase the reactive power provided to the net, when the output power provided by the power converter circuit 1 increases.

Active Power Derating

According to a further embodiment, the operation mode controller 50 is configured to detect the frequency of the external AC voltage and is configured to reduce the output power of the power converter circuit 1 when the frequency reaches a frequency threshold such as 50.2 Hz or 60.3 Hz that is above a set value, such as 50 Hz or 60 Hz. The frequency of a grid voltage may increase when there is more power input to the grid than there is power consumed by consumers connected to the grid.

The output power of the power converter circuit 1 can be controlled by controlling the input voltages V3 of the individual converter units 2. This has been explained in connection with "start-up sequence A" before. The information that a reduction of the output power of the individual converter units 2 is required, may be transmitted from the operation mode controller 50 to the individual converter units 2 through the same channel through which the synchronization signal $S_{v1}$ is transmitted.

Restart

Referring to the explanation above, there may be operation scenarios when the power converter circuit 1 is shut down after an error has occurred. After the power converter circuit 1 has been shut down the power converter circuit can be restarted using one of the start-up sequences explained herein before. In the following, "to restart" the power converter circuit 1 means to employ one of the start-up sequences to again start the power converter circuit 1.

When, e.g., the power converter circuit 1 has been shut down due to an error of the power grid, the operation mode controller 50 can be configured to check the external AC voltage v1 and can be configured to restart the power converter circuit 1 after the grid voltage v1 has returned to normal. The operation mode controller 50 may be configured to check the grid voltage in regular time intervals, such as every minute, every five minutes, etc.

When, e.g., the power converter circuit 1 has been shut down due to an undervoltage condition, due to automatic shutdown, or due to a phase difference, the operation mode controller may be configured to restart the power converter circuit after a given time period, such as, e.g., one minute, two minutes, etc.

Of course, the occurrence of an error may also be detected during start-up so that it is even possible to shut down the power converter circuit 1 before the normal operation mode has been reached.

Referring to explanation before, the output current i1 of the individual converter units 2 may be increased in accordance with a given time profile during the start-up phase. This current profile may be fixed current profile. According to a further embodiment, the profile of the output current i1 during start-up is limited dependent on the shut-down history, which means dependent on whether the power converter circuit 1 has been shut down due to an error. According to one embodiment the output current is increased slower (in accordance with a shallower current profile) when the power converter circuit 1 has been shut down due to an undervoltage condition, due to automatic shutdown, or due to a phase difference. When the restart fails because an error has occurred during the start-up phase, an even shallower current profile may be applied after the next restart. A "shallower current profile" is a profile in which the current increases slower.

In the embodiments explained before, the synchronization signal $S_{v1}$ is provided by the synchronization circuit 10, where the synchronization circuit 10 is configured to generate the synchronization signal $S_{v1}$ dependent on the external AC voltage v1, e.g., in the normal mode, or independent of the external AC voltage, e.g., when an error has occurred.

Figure 35:
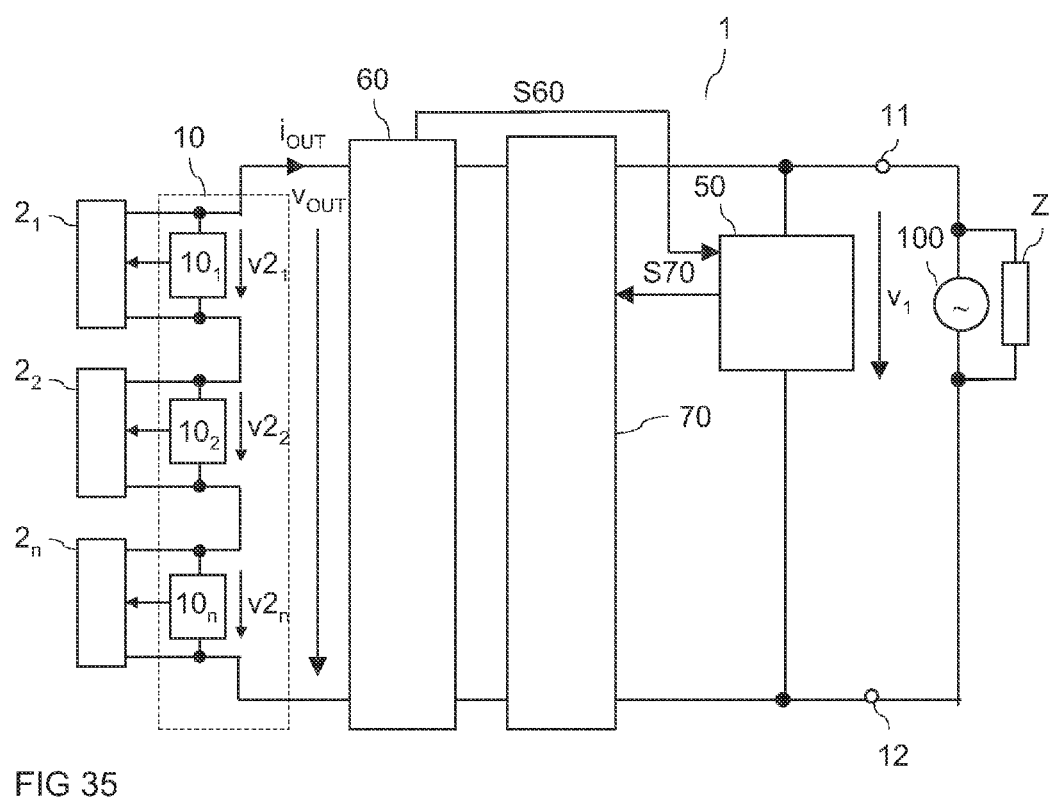
FIG. 35 illustrates a further embodiment of a power converter circuit.

According to a further embodiment illustrated in FIG. 35, the synchronization circuit 10 includes synchronization units $10_1$, $10_2$, $10_n$ with each synchronization unit $10_1$, $10_2$, $10_n$ coupled to the output terminals of one converter unit $2_1$, $2_2$, $2_n$, configured to measure the output voltage v2$_1$, v2$_2$, v2$_n$ of the corresponding converter unit $2_1$, $2_2$, $2_n$, to generate a synchronization signal dependent on the measured output voltage and to provide the synchronization signal to the corresponding converter unit $2_1$, $2_2$, $2_n$. According to one embodiment, the individual synchronization signals are proportional to the output voltages v2$_1$, v2$_2$, v2$_n$, so that the individual synchronization units $10_1$, $10_2$, $10_3$ may be implemented as voltage measurement units.

Figure 36:
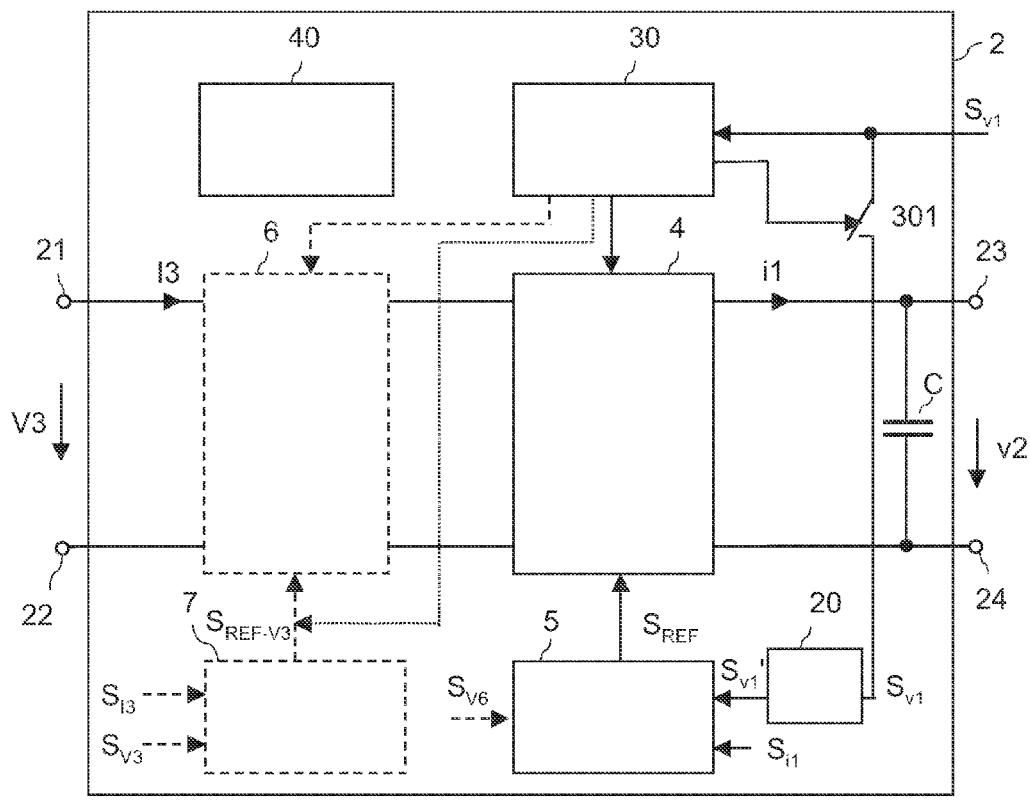
FIG. 36 illustrates an embodiment of a converter unit implemented in the power converter circuit of FIG. 35.

An embodiment of a converter unit 2 that can be used in the power converter circuit 1 of FIG. 35 is illustrated in FIG. 36. The converter unit 2 of FIG. 36 is based on the converter unit 2 explained in detail with reference to FIG. 32. In the converter unit 2 of FIG. 36, the synchronization signal $S_{v1}$ is a voltage measurement signal received by measuring the output voltage v2 of the converter unit 2. The operating principle of the converter unit 2 of FIG. 36 is explained below.

For explanation purposes it is assumed, that the power converter circuit 1 is in the standby mode. In the standby mode, the power converter circuit 1 is connected to the output terminals 11, 12 (see FIG. 35) so that the external AC voltage v1 is applied to the series circuit with the individual converter units 2. In the standby mode, when the output power of the power converter circuit 1 is zero, the output capacitances (C in the converter unit 2 of FIG. 36) of the individual converter units 2 act as a capacitive voltage divider so that the voltages v2 at the outputs of the individual converter units 2 are in phase with the external AC voltage v1. The start-up sequence employed to start up the individual converter units 2 corresponds to start-up sequence B explained before, with the following differences:

At the beginning of the start-up sequence or before the beginning of the start-up sequence, the synchronization signal $S_{v1}$ is provided to the signal generator 20 for a short time period, such as for several periods of the synchronization signal $S_{v1}$, which at this time is a sinusoidal signal that is in phase with the external Ac voltage v1. The signal generator 20 synchronizes to the synchronization signal $S_{v1}$ and then autonomously generates the continuous synchronization signal $S_{v1'}$ in the start-up phase and in the normal mode after the start-up phase. The signal generator 20 can be implemented as explained with reference to FIG. 29 before.

Referring to FIG. 36, the operation mode unit 30 may control the time period when the synchronization signal $S_{v1}$ is provided to the signal generator 20. This is schematically illustrated by having a switch 301 connected between the synchronization unit (not shown in FIG. 36) and the signal generator 20, with the switch being controlled by the operation mode unit. However, this serves to illustrate the operating rather than the implementation. Of course, many different means may be employed to provide the synchronization signal $S_{v1}$ that is dependent on the output voltage v2 to the signal generator for a given time period before or at the beginning of the start-up sequence.

In this converter circuit 1, after the converter circuit 1 has entered the normal mode, the operation mode controller 50 may be configured to detect a phase difference between the output current i1 and the external AC voltage and to shut down the converter circuit 1 when the phase difference exceeds a given threshold. The converter circuit 1 may be shut down as explained before in the paragraph TRANSMISSION OF SHUT-DOWN INFORMATION II. The restart mechanism may correspond to one of the restart mechanisms explained before. At a restart after the shut-down, the converter circuit 1 will again be synchronized to the external voltage v 1 as explained before.

According to a further embodiment, the operation mode controller 50 provides a phase shift signal, corresponding to the phase shift signal $S_\phi$ explained before, to control circuits 5 of the individual converter units 2. In this embodiment, the operation mode controller 50 is configured to adapt the phase shift signal $S_\phi$ when the phase difference between the output current $i_{OUT}$ and the external voltage v1 is above a first phase difference threshold and below a second phase difference threshold, in order to prevent a further a further increase of the phase difference. Further, the operation mode controller 50 is configured to shut down the converter circuit in order to force a restart when a the phase difference is above the second phase difference threshold.

Each of the circuits explained before may be implemented as analog or digital circuit, or as a mixed circuit with analog and digital circuit means. Consequently, the signals explained before may be analog or digital signals. In case of the synchronization signal $S_{v1}$ or $S_{v1'}$, respectively, "continuous synchronization signal" means that the synchronization signal is available in each period of the AC output current i1 and has a waveform corresponding to the waveform of the corresponding output current i1.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a" "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

It is to be understood that the features of the various embodiments described herein may be combined with each other, unless specifically noted otherwise.

What is claimed is:

1. A power converter circuit, comprising:
   output terminals configured to receive an external voltage; and
   a series circuit with a plurality of converter units connected between the output terminals of the power converter circuit, each converter unit comprising input terminals configured to be coupled to a DC power source and output terminals configured to provide an output current, wherein at least one converter unit of the plurality of converter units comprises a signal generator configured to receive a synchronization signal and to generate a continuous synchronization signal from the synchronization signal;
   wherein the power converter circuit can be operated in a normal operation mode, and
   wherein, in the normal operation mode, the at least one converter unit is configured to regulate generation of the output current such that a frequency and/or a phase of the output current are dependent on the continuous synchronization signal.

2. The power converter circuit of claim 1,
   wherein the synchronization signal comprises an AC signal, and
   wherein the signal generator is configured to receive the synchronization signal for a given time period, is configured to detect a frequency and a phase of the synchronization signal, and is configured to generate the continuous synchronization signal dependent on the detected frequency and phase after the given time period.

3. The power converter circuit of claim 2, wherein the synchronization signal is dependent on a voltage between the output terminals of the at least one converter unit.

4. The power converter circuit of claim 2, wherein the at least one converter unit is configured to generate the output current such that there is a given phase difference between the output current and the continuous synchronization signal.

5. The power converter circuit of claim 1,
   wherein the synchronization signal is a pulsed signal comprising a plurality of signal pulses,
   wherein the signal generator is configured to generate the continuous synchronization signal with a frequency and a phase dependent on the frequency and the phase of the pulsed signal.

6. The power converter circuit of claim 5, wherein the at least one converter unit is configured to generate the output current such that there is a given phase difference between the output current and the continuous synchronization signal.

7. The power converter circuit of claim 5, further comprising a synchronization circuit configured to receive the external voltage and to generate the synchronization signal dependent on the external voltage.

8. The power converter circuit of claim 7, wherein the synchronization circuit is configured to generate a signal pulse of the synchronization signal each time a positive or a negative zero crossing of the external voltage occurs.

9. The power converter circuit of claim 1, further comprising:
   an operation mode controller, configured to detect a shut-down condition and configured to interrupt a connection between the series circuit and the output terminals upon detection of a shut-down condition.

10. The power converter circuit of claim 9, wherein the operation mode controller is configured to detect the shutdown condition when at least one of the following conditions is met:
- an output current at the output terminals of the power converter circuit is below a given current threshold;
- a phase difference between the output current at the output terminals of the power converter circuit and an output voltage at the output terminals of the power converter circuit is above a given phase difference threshold; or
- the output voltage falls below a given voltage threshold.

11. The power converter circuit of claim 9,
wherein the at least one converter unit is configured to generate zero output current when a voltage between the output terminals of the at least one converter unit reaches a given voltage threshold.

12. The power converter circuit of claim 1, wherein the at least one converter unit comprises:
- a DC/AC converter coupled between the input terminals and the output terminals of the at least one converter unit, the DC/AC converter configured to generate the output current with a frequency and phase that is dependent on a first reference signal; and
- a control circuit configured to generate the first reference signal dependent on the synchronization signal and the output current of the at least one converter unit.

13. The power converter circuit of claim 12,
wherein the DC/AC converter is configured to receive an input voltage, and
wherein the control circuit is configured to generate the first reference signal dependent on the input voltage.

14. The power converter circuit of claim 12, wherein the at least one converter unit further comprises:
- a DC/DC converter coupled between the input terminals of the at least one converter unit and the DC/AC converter, the DC/DC converter configured to adjust an input voltage between the input terminals and/or an input current at the input terminals dependent on a second reference signal; and
- a reference signal source configured to provide the second reference signal.

15. The power converter circuit of claim 14, wherein the reference signal source is implemented as a maximum power point tracker and is configured to generate the second reference signal dependent on the input voltage and the input current of the at least one converter unit.

16. The power converter circuit of claim 14, wherein the DC/DC converter is a boost converter or a buck converter.

17. The power converter circuit of claim 7, comprising:
- a plurality of series circuits connected in parallel, wherein the series circuit is one of the plurality of series circuits and wherein each series circuit comprises a plurality of converter units connected between the output terminals, and
- wherein the converter units of the series circuits are coupled to the synchronization circuit.

18. A power supply system, comprising:
- output terminals configured to receive an external voltage;
- a series circuit with a plurality of converter units connected between the output terminals of the power supply system, each converter unit comprising input terminals and output terminals for providing an output current, wherein at least one converter unit comprises a signal generator configured to receive a synchronization signal and configured to generate a continuous synchronization signal from the synchronization signal; and
- a plurality of DC power sources, each DC power source coupled to the input terminals of one of the converter units,
- wherein the power supply system can be operated in a normal operation mode, and
- wherein, in the normal operation mode, the at least one converter unit is configured to regulate generation of the output current such that a frequency and/or a phase of the output current are dependent on the continuous synchronization signal.

19. The power supply system of claim 18, wherein each DC power source comprises a photovoltaic array with at least one solar cell.

20. The power supply system, of claim 18, wherein each DC power source comprises a fuel cell.

* * * * *